(12) United States Patent
Walters et al.

(10) Patent No.: US 9,686,477 B2
(45) Date of Patent: Jun. 20, 2017

(54) LIGHTING FIXTURE WITH IMAGE SENSOR

(71) Applicant: Cree, Inc., Durham, NC (US)

(72) Inventors: Mike Walters, Apex, NC (US); Andrew Dummer, Chapel Hill, NC (US)

(73) Assignee: Cree, Inc., Durham, NC (US)

( * ) Notice: Subject to any disclaimer, the term of this patent is extended or adjusted under 35 U.S.C. 154(b) by 122 days.

(21) Appl. No.: 14/623,314

(22) Filed: Feb. 16, 2015

(65) Prior Publication Data

US 2016/0241765 A1  Aug. 18, 2016

(51) Int. Cl.
*H04N 5/235* (2006.01)
*H04N 7/18* (2006.01)

(52) U.S. Cl.
CPC ........... *H04N 5/2354* (2013.01); *H04N 7/183* (2013.01)

(58) Field of Classification Search
None
See application file for complete search history.

(56) References Cited

U.S. PATENT DOCUMENTS

| | | |
|---|---|---|
| 1,099,061 A | 6/1914 | Lane |
| 6,100,643 A | 8/2000 | Nilssen |
| 6,528,954 B1 | 3/2003 | Lys et al. |
| 6,948,829 B2 | 9/2005 | Verdes et al. |
| 7,187,136 B2 | 3/2007 | Fiorello |
| 7,396,146 B2 | 7/2008 | Wang |
| 7,502,054 B2 | 3/2009 | Kalapathy et al. |
| 7,549,772 B2 | 6/2009 | Wang |
| 7,677,767 B2 | 3/2010 | Chyn |
| 7,888,881 B2 | 2/2011 | Shteynberg et al. |
| 8,466,628 B2 | 6/2013 | Shearer et al. |
| 8,610,377 B2 | 12/2013 | Chemel et al. |

(Continued)

FOREIGN PATENT DOCUMENTS

| | | |
|---|---|---|
| EP | 2213932 A1 | 8/2010 |
| WO | 2011070058 A2 | 6/2011 |
| WO | 2011087681 A1 | 7/2011 |

OTHER PUBLICATIONS

Examination Report for German Patent Application No. 112012005131.9, mailed Aug. 5, 2015, 18 pages.

(Continued)

*Primary Examiner* — Timothy J Henn
(74) *Attorney, Agent, or Firm* — Withrow & Terranova, P.L.L.C.

(57) ABSTRACT

A lighting fixture with a control system, a light source, and an image sensor is disclosed. The image sensor is configured to capture an image in response to an image capture signal. The light source emits light in response to a drive signal. The control system provides the drive signal to control the light emitted by the light source, and when an image needs to be captured, provides the image capture signal. When capturing an image, the control system may coordinate the drive signal and the image capture signal so that the image sensor captures the image when the light source is emitting light, if light is needed or desired. The control system may control the drive signal to control the light emitted by the light source or control other lighting fixtures in the lighting network based, at least in part, on information derived from one or more captured images.

48 Claims, 22 Drawing Sheets

(56) References Cited

U.S. PATENT DOCUMENTS

| | | |
|---|---|---|
| 8,829,800 B2 | 9/2014 | Harris |
| 2005/0111234 A1 | 5/2005 | Martin et al. |
| 2007/0013557 A1 | 1/2007 | Wang et al. |
| 2007/0024213 A1 | 2/2007 | Shteynberg et al. |
| 2007/0132405 A1 | 6/2007 | Hillis et al. |
| 2008/0158887 A1 | 7/2008 | Zhu et al. |
| 2008/0273754 A1* | 11/2008 | Hick .......... G06K 9/00771 382/103 |
| 2009/0021955 A1 | 1/2009 | Kuang et al. |
| 2009/0086492 A1 | 4/2009 | Meyer |
| 2009/0219727 A1 | 9/2009 | Weaver |
| 2009/0262189 A1* | 10/2009 | Marman .......... G08B 13/19613 348/143 |
| 2009/0267540 A1 | 10/2009 | Chemel et al. |
| 2010/0007289 A1 | 1/2010 | Budike, Jr. |
| 2010/0110699 A1 | 5/2010 | Chou |
| 2010/0177509 A1 | 7/2010 | Pickard |
| 2010/0182294 A1* | 7/2010 | Roshan .......... G01J 1/32 345/207 |
| 2010/0262296 A1* | 10/2010 | Davis .......... G05B 15/02 700/275 |
| 2010/0270935 A1 | 10/2010 | Otake et al. |
| 2010/0295946 A1* | 11/2010 | Reed .......... H05B 37/0227 348/164 |
| 2010/0301770 A1 | 12/2010 | Chemel et al. |
| 2011/0006604 A1 | 1/2011 | Chang et al. |
| 2011/0095709 A1 | 4/2011 | Diehl et al. |
| 2011/0133655 A1 | 6/2011 | Recker et al. |
| 2011/0248640 A1 | 10/2011 | Welten |
| 2012/0026733 A1 | 2/2012 | Graeber et al. |
| 2012/0043912 A1 | 2/2012 | Huynh et al. |
| 2012/0143357 A1* | 6/2012 | Chemel .......... G01D 18/00 700/90 |
| 2012/0229041 A1 | 9/2012 | Saes et al. |
| 2012/0235579 A1* | 9/2012 | Chemel .......... F21S 2/005 315/152 |
| 2013/0033872 A1 | 2/2013 | Randolph et al. |
| 2013/0063042 A1 | 3/2013 | Bora et al. |
| 2013/0154831 A1 | 6/2013 | Gray et al. |
| 2013/0257292 A1 | 10/2013 | Verfuerth et al. |
| 2013/0307419 A1* | 11/2013 | Simonian .......... H05B 33/0872 315/153 |
| 2014/0001952 A1 | 1/2014 | Harris et al. |
| 2014/0001962 A1 | 1/2014 | Harris |
| 2014/0001963 A1* | 1/2014 | Chobot .......... H05B 37/02 315/153 |
| 2014/0072211 A1* | 3/2014 | Kovesi .......... G06T 7/2053 382/164 |
| 2015/0008829 A1 | 1/2015 | Lurie et al. |
| 2015/0008831 A1* | 1/2015 | Carrigan .......... H05B 33/0842 315/153 |
| 2015/0305119 A1* | 10/2015 | Hidaka .......... H05B 37/0218 315/153 |
| 2015/0373808 A1* | 12/2015 | Kuo .......... H05B 37/0218 315/158 |
| 2016/0100086 A1* | 4/2016 | Chien .......... H04N 5/2256 348/143 |

OTHER PUBLICATIONS

Final Office Action for U.S. Appl. No. 13/649,531, mailed Oct. 8, 2015, 8 pages.
Final Office Action for U.S. Appl. No. 13/589,899, mailed Nov. 6, 2015, 12 pages.
Non-Final Office Action for U.S. Appl. No. 13/649,531, mailed Jun. 4, 2015, 9 pages.
Final Office Action for U.S. Appl. No. 13/868,021, mailed Jul. 23, 2015, 11 pages.
Non-Final Office Action for U.S. Appl. No. 13/868,021, mailed Jun. 27, 2016, 9 pages.
Notification of Refusal for German Patent Application No. 112012005131.9, mailed Apr. 11, 2016, 13 pages.
Non-Final Office Action for U.S. Appl. No. 13/589,899, mailed May 5, 2016, 11 pages.
Advisory Action for U.S. Appl. No. 13/649,531, mailed Dec. 24, 2015, 3 pages.
First Office Action for Chinese Patent Application No. 201380045126A, mailed Feb. 1, 2016, 20 pages.
Advisory Action for U.S. Appl. No. 13/589,899, mailed Feb. 11, 2016, 3 pages.
Author Unknown, "White Paper: Breakthrough video technology solves persistent image problems with fluorescent lights and LEDs, while maintaining wide dynamic range," 2009, Pixim, Inc., 7 pages.
International Search Report and Written Opinion for PCT/US2012/067754 mailed Feb. 20, 2013, 11 pages.
International Preliminary Report on Patentability for PCT/US2012/067754, mailed Jun. 19, 2014, 8 pages.
International Search Report and Written Opinion for PCT/US2013/047602, mailed Oct. 11, 2013, 13 pages.
International Preliminary Report on Patentability for PCT/US2013/047602, mailed Jan. 15, 2015, 10 pages.
International Search Report and Written Opinion for PCT/US2013/058256, mailed Dec. 17, 2013, 9 pages.
International Preliminary Report on Patentability for PCT/US2013/058256, mailed Mar. 19, 2015, 7 pages.
Non-Final Office Action for U.S. Appl. No. 13/589,899, mailed Apr. 2, 2014, 15 pages.
Non-Final Office Action for U.S. Appl. No. 13/589,899, mailed Apr. 20, 2015, 12 pages.
Notice of Allowance for U.S. Appl. No. 13/606,713, mailed May 2, 2014, 7 pages.
Non-final Office Action for U.S. Appl. No. 13/649,531, mailed Jul. 31, 2014, 7 pages.
Final Office Action for U.S. Appl. No. 13/649,531, mailed Dec. 16, 2014, 7 pages.
Non-Final Office Action for U.S. Appl. No. 13/868,021, mailed Apr. 17, 2015, 10 pages.
Non-Final Office Action for U.S. Appl. No. 13/589,899, mailed Nov. 2, 2016, 13 pages.
Final Office Action for U.S. Appl. No. 13/868,021, mailed Nov. 25, 2016, 11 pages.
Advisory Action for U.S. Appl. No. 13/868,021, mailed Jan. 31, 2017, 2 pages.
Examination Report for European Patent Application No. 13762691.7, mailed Dec. 6, 2016, 5 pages.
Examiner's Answer to the Appeal Brief for U.S. Appl. No. 13/649,531, mailed Sep. 8, 2016, 7 pages.
Final Office Action for U.S. Appl. No. 13/589,899, mailed May 8, 2017, 13 pages.
Non-Final Office Action for U.S. Appl. No. 13/868,021, mailed Mar. 3, 2017, 18 pages.

* cited by examiner

US 9,686,477 B2

LIGHTING FIXTURE WITH IMAGE SENSOR

FIELD OF THE DISCLOSURE

The present disclosure relates to lighting fixtures, and in particular to lighting fixtures with an image sensor.

BACKGROUND

In recent years, a movement has gained traction to replace incandescent light bulbs with lighting fixtures that employ more efficient lighting technologies as well as to replace relatively efficient fluorescent lighting fixtures with lighting technologies that produce a more pleasing, natural light. One such technology that shows tremendous promise employs light emitting diodes (LEDs). Compared with incandescent bulbs, LED-based light fixtures are much more efficient at converting electrical energy into light, are longer lasting, and are also capable of producing light that is very natural. Compared with fluorescent lighting, LED-based fixtures are also very efficient, but are capable of producing light that is much more natural and more capable of accurately rendering colors. As a result, lighting fixtures that employ LED technologies are replacing incandescent and fluorescent bulbs in residential, commercial, and industrial applications.

Unlike incandescent bulbs that operate by subjecting a filament to a desired current, LED-based lighting fixtures require electronics to drive one or more LEDs. The electronics generally include a power supply and special control circuitry to provide uniquely configured signals that are required to drive the one or more LEDs in a desired fashion. The presence of the control circuitry adds a potentially significant level of intelligence to the lighting fixtures that can be leveraged to employ various types of lighting control. Such lighting control may be based on various environmental conditions, such as ambient light, occupancy, temperature, and the like.

SUMMARY

In general, a lighting fixture with a control system, a light source, and an image sensor is disclosed. The image sensor is configured to capture an image in response to an image capture signal. The light source emits light in response to a drive signal. The control system provides the drive signal to control the light emitted by the light source, and when an image needs to be captured, provides the image capture signal. When capturing an image, the control system may coordinate the drive signal and the image capture signal so that the image sensor captures the image when the light source is emitting light, if light is needed or desired during image capture. The control system may also control the drive signal to control the light emitted by the light source or control other lighting fixtures in the lighting network based, at least in part, on information derived from one or more captured images. The captured images may be analyzed to determine occupancy, ambient light characteristics, or a combination thereof.

In one embodiment, the light source of the lighting fixture is responsive to a pulse-width modulated (PWM) drive signal. The duty cycle of the PWM drive signal dictates a relative dimming level of the light source's light output during general illumination. For each period of the PWM signal, the light source outputs light during an active portion of the PWM drive signal and does not output light during an inactive portion of the PWM drive signal. When capturing an image, the control system provides the image capture signal so that the image is captured by the image sensor during the active portion of the PWM drive signal, such that the light source is outputting light while the image is being captured, if light is needed or desired during image capture.

Images from the various lights may be sent to a central security location for monitoring or storage. The images may represent still images as well as full or partial frames of a video.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

Figure 1:
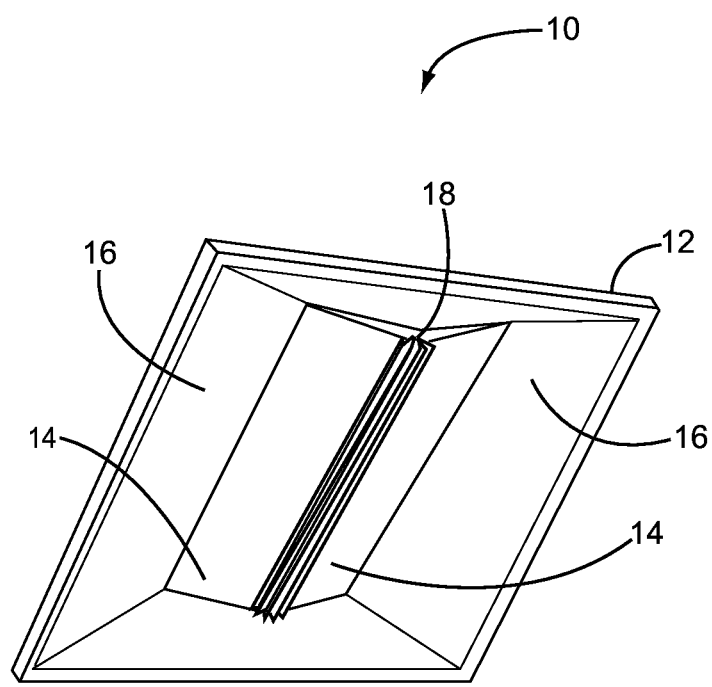
FIG. 1 is a perspective view of a troffer-based lighting fixture according to one embodiment of the disclosure.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that relative terms such as "front," "forward," "rear," "below," "above," "upper," "lower," "horizontal," or "vertical" may be used herein to describe a relationship of one element, layer or region to another element, layer or region as illustrated in the figures. It will be understood that these terms are intended to encompass different orientations of the device in addition to the orientation depicted in the figures.

In general, a lighting fixture with control system, a light source, and an image sensor is disclosed. The image sensor is configured to capture an image in response to an image capture signal. The light source emits light in response to a drive signal. The control circuitry provides the drive signal to control the light emitted by the light source, and when an image needs captured, provides the image capture signal. When capturing an image, the control circuitry may coordinate the drive signal and the image capture signal so that the image sensor captures the image when the light source is emitting light, if light is needed or desired during image capture. The control circuitry may also control the drive signal to control the light emitted by the light source or control other lighting fixtures in the lighting network based, at least in part, on information derived from one or more captured images. The captures images may be analyzed to determine occupancy, ambient light characteristics, or a combination thereof.

In one embodiment, the light source of the lighting fixture is responsive to a pulse-width modulated (PWM) drive signal. The duty cycle of the PWM drive signal dictates a relative dimming level of the light source's light output during general illumination. For each period of the PWM signal, the light source outputs light during an active portion of the PWM drive signal and does not output light during an inactive portion of the PWM drive signal. When capturing an image, the control system provides the image capture signal so that the image is captured by the image sensor during the active portion of the PWM drive signal such that the light source is outputting light while the image is being captured, if light is needed or desired during image capture.

Prior to delving into the details of the present disclosure, an overview of an exemplary lighting fixture is provided. While the concepts of the present disclosure may be employed in any type of lighting system, the immediately following description describes these concepts in a troffer-type lighting fixture, such as the lighting fixture 10 illustrated in FIGS. 1-3. This particular lighting fixture is substantially similar to the CR and CS series of troffer-type lighting fixtures that are manufactured by Cree, Inc. of Durham, N.C.

While the disclosed lighting fixture 10 employs an indirect lighting configuration wherein light is initially emitted upward from a light source and then reflected downward, direct lighting configurations may also take advantage of the concepts of the present disclosure. In addition to troffer-type lighting fixtures, the concepts of the present disclosure may also be employed in recessed lighting configurations, wall mount lighting configurations, outdoor lighting configurations, and the like. Reference is made to co-pending and co-assigned U.S. patent application Ser. No. 13/589,899 filed Aug. 20, 2013, Ser. No. 13/649,531 filed Oct. 11, 2012, and Ser. No. 13/606,713, now U.S. Pat. No. 8,829,800, filed Sep. 7, 2012, the contents of which are incorporated herein by reference in their entireties. Further, the functionality and control techniques described below may be used to control different types of lighting fixtures, as well as different groups of the same or different types of lighting fixtures at the same time.

Figure 2:
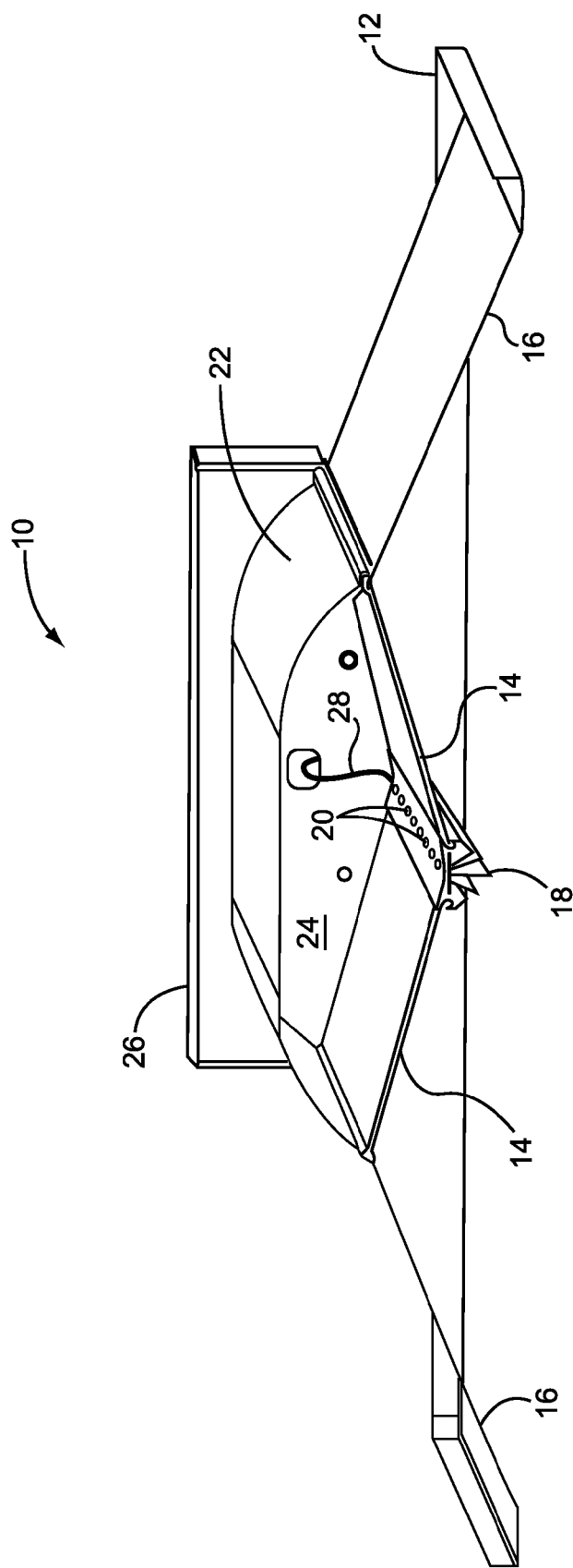
FIG. 2 is a cross-section of the lighting fixture of FIG. 1.
Figure 3:
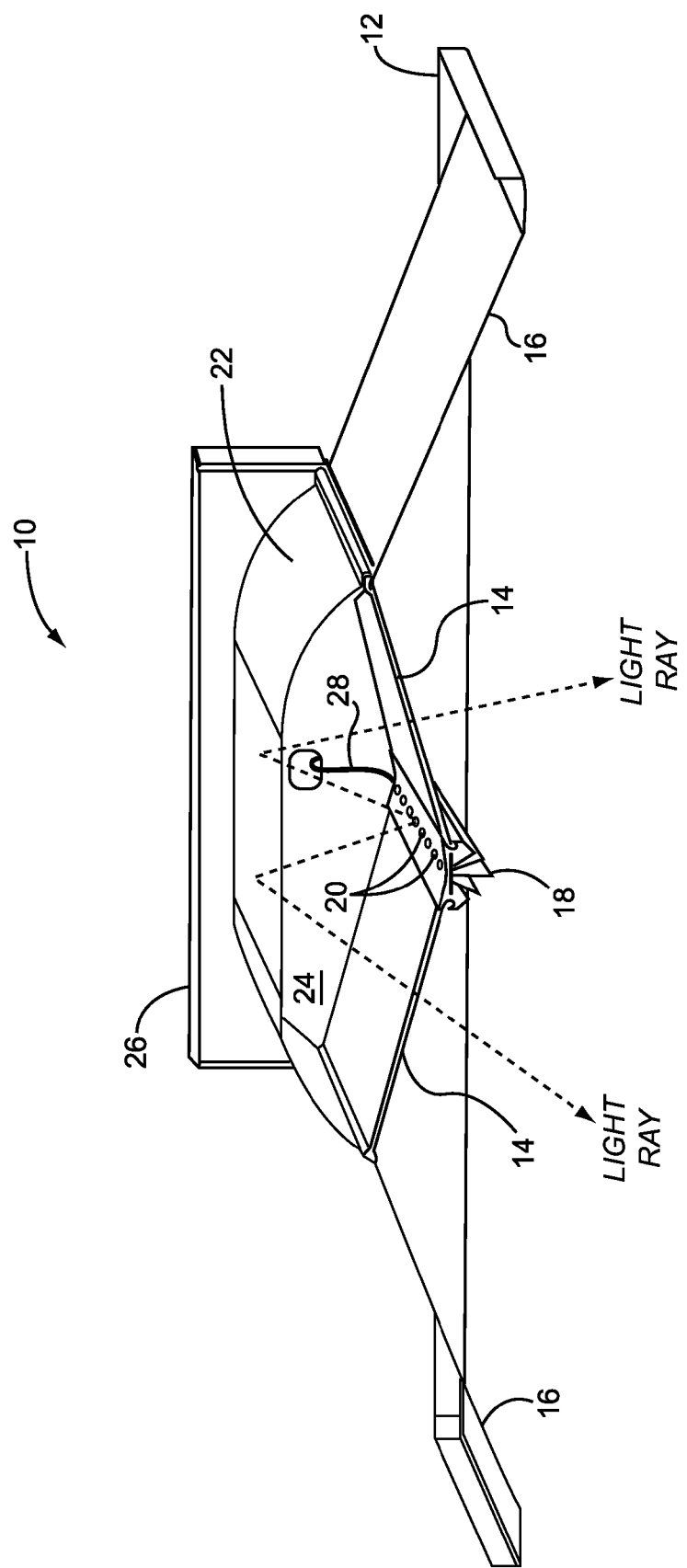
FIG. 3 is a cross-section of the lighting fixture of FIG. 1 illustrating how light emanates from the LEDs of the lighting fixture and is reflected out through lenses of the lighting fixture.

In general, troffer-type lighting fixtures, such as the lighting fixture 10, are designed to mount in, on, or from a ceiling. In most applications, the troffer-type lighting fixtures are mounted into a drop ceiling (not shown) of a commercial, educational, or governmental facility. As illustrated in FIGS. 1-3, the lighting fixture 10 includes a square or rectangular outer frame 12. In the central portion of the lighting fixture 10 are two rectangular lenses 14, which are generally transparent, translucent, or opaque. Reflectors 16 extend from the outer frame 12 to the outer edges of the lenses 14. The lenses 14 effectively extend between the innermost portions of the reflectors 16 to an elongated heatsink 18, which functions to join the two inside edges of the lenses 14.

Turning now to FIGS. 2 and 3 in particular, the back side of the heatsink 18 provides a mounting structure for a solid-state light source, such as an LED array 20, which includes one or more rows of individual LEDs mounted on an appropriate substrate. The LEDs are oriented to primarily emit light upwards toward a concave cover 22. The volume bounded by the cover 22, the lenses 14, and the back of the heatsink 18 provides a mixing chamber 24. As such, light will emanate upwards from the LEDs of the LED array 20 toward the cover 22 and will be reflected downward through the respective lenses 14, as illustrated in FIG. 3. Notably, not all light rays emitted from the LEDs will reflect directly off of the bottom of the cover 22 and back through a particular lens 14 with a single reflection. Many of the light rays will bounce around within the mixing chamber 24 and effectively mix with other light rays, such that a desirably uniform light is emitted through the respective lenses 14.

Those skilled in the art will recognize that the type of lenses 14, the type of LEDs, the shape of the cover 22, and any coating on the bottom side of the cover 22, among many other variables, will affect the quantity and quality of light emitted by the lighting fixture 10. As will be discussed in greater detail below, the LED array 20 may include LEDs of different colors, wherein the light emitted from the various LEDs mixes together to form a white light having a desired characteristic, such as spectral content (color or color temperature), color rendering index (CRI), output level, and the like based on the design parameters for the particular embodiment, environmental conditions, or the like.

As is apparent from FIGS. 2 and 3, the elongated fins of the heatsink 18 may be visible from the bottom of the lighting fixture 10. Placing the LEDs of the LED array 20 in thermal contact along the upper side of the heatsink 18 allows any heat generated by the LEDs to be effectively transferred to the elongated fins on the bottom side of the heatsink 18 for dissipation within the room in which the lighting fixture 10 is mounted. Again, the particular configuration of the lighting fixture 10 illustrated in FIGS. 1-3 is merely one of the virtually limitless configurations for lighting fixtures 10 in which the concepts of the present disclosure are applicable.

Figure 4:
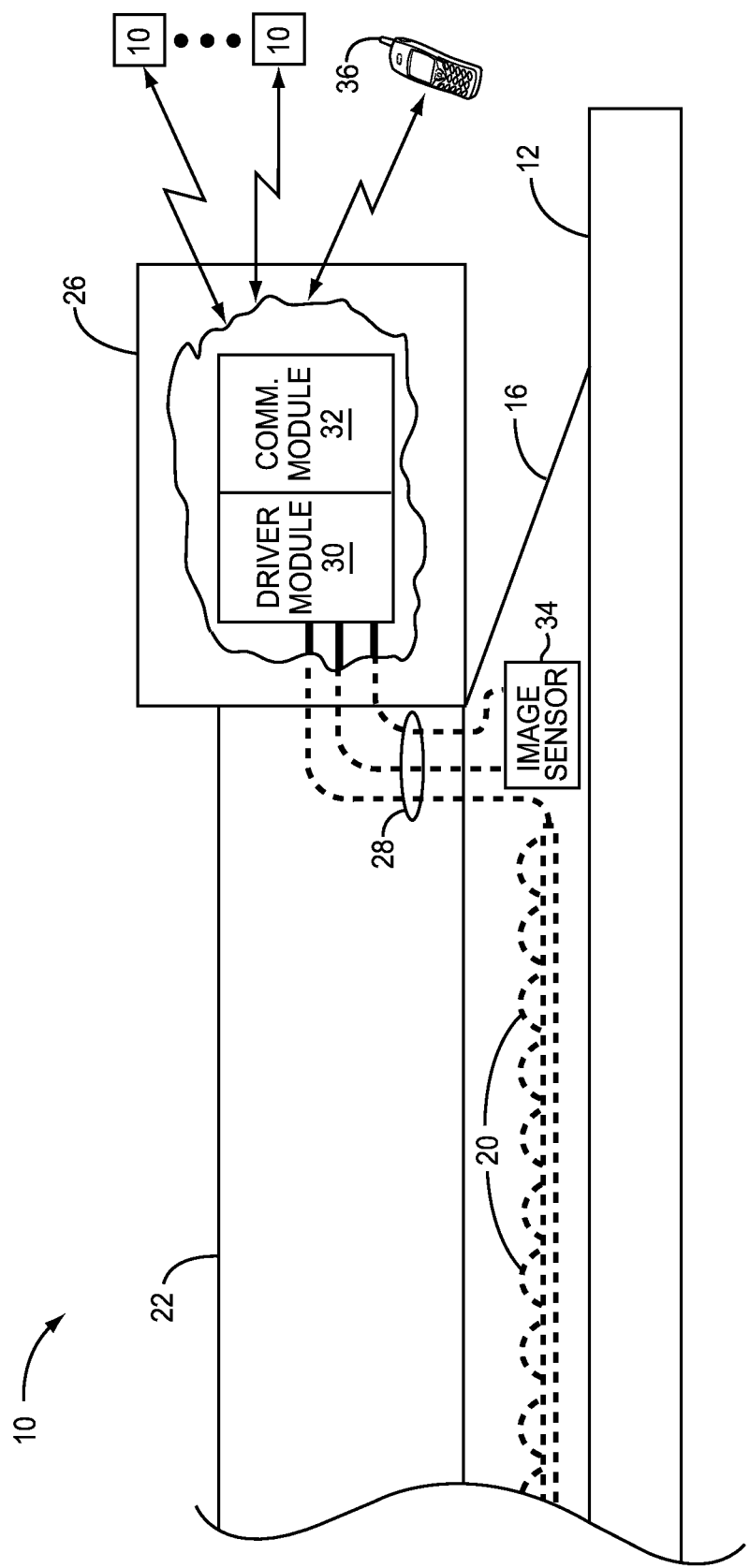
FIG. 4 illustrates a driver module and a communications module integrated within an electronics housing of the lighting fixture of FIG. 1.

With continued reference to FIGS. 2 and 3, an electronics housing 26 is shown mounted at one end of the lighting fixture 10, and is used to house all or a portion of the control circuitry (not shown) used to control the LED array 20 and interface with various sensors, such as the image sensor 34. The image sensor 34 may be a CCD (charge-coupled device), CMOS (complementary metal-oxide semiconductor) or like image sensor. The image sensor 34 is oriented in the lighting fixture 10 and configured to capture a field of view that roughly corresponds to an area that is illuminated by light emitted from the lighting fixture 10. The image sensor 34 and its use are described in further detail below. The control circuitry is coupled to the LED array 20 and the image sensor 34 through appropriate cabling 28. With reference to FIG. 4, the control circuitry is provided by a driver module 30, a communications module 32, or a combination thereof.

At a high level, the driver module 30 is coupled to the LED array 20 through the cabling 28 and directly drives the LEDs of the LED array 20 based on information provided by the communications module 32 and information garnered from the image data obtained from the image sensor 34. In one embodiment, the driver module 30 provides the primary intelligence for the lighting fixture 10 and is capable of driving the LEDs of the LED array 20 in a desired fashion. The driver module 30 may be provided on a single, integrated module or divided into two or more sub-modules depending the desires of the designer.

When the driver module 30 provides the primary intelligence for the lighting fixture 10, the communications module 32 acts primarily as a communication interface that facilitates communications between the driver module 30 and other lighting fixtures 10, a remote control system (not shown), or a portable handheld commissioning tool 36, which may also be configured to communicate with a remote control system in a wired or wireless fashion.

Alternatively, the driver module 30 may be primarily configured to drive the LEDs of the LED array 20 based simply on instructions from the communications module 32. In such an embodiment, the primary intelligence of the lighting fixture 10 is provided in the communications module 32, which effectively becomes an overall control module, with wired or wireless communication capability, for the lighting fixture 10. The lighting fixture 10 may share and exchange image data, instructions, and any other data with other lighting fixtures 10 in the lighting network or with remote entities. In essence, the communications module 32 facilitates the sharing of intelligence and data among the lighting fixtures 10 and other entities, and in certain embodiments, may be the primary controller for the lighting fixture 10.

In the embodiment of FIG. 4, the communications module 32 may be implemented on a separate printed circuit board (PCB) than the driver module 30. The respective PCBs of the driver module 30 and the communications module 32 may be configured to allow the connector of the communications module 32 to plug into the connector of the driver module 30, wherein the communications module 32 is mechanically mounted, or affixed, to the driver module 30 once the connector of the communications module 32 is plugged into the mating connector of the driver module 30.

In other embodiments, a cable may be used to connect the respective connectors of the driver module 30 and the communications module 32, other attachment mechanisms may be used to physically couple the communications module 32 to the driver module 30, or the driver module 30 and the communications module 32 may be separately affixed to the inside of the electronics housing 26. In such embodiments, the interior of the electronics housing 26 is sized appropriately to accommodate both the driver module 30 and the communications module 32. In many instances, the electronics housing 26 provides a plenum rated enclosure for both the driver module 30 and the communications module 32.

Figure 5:
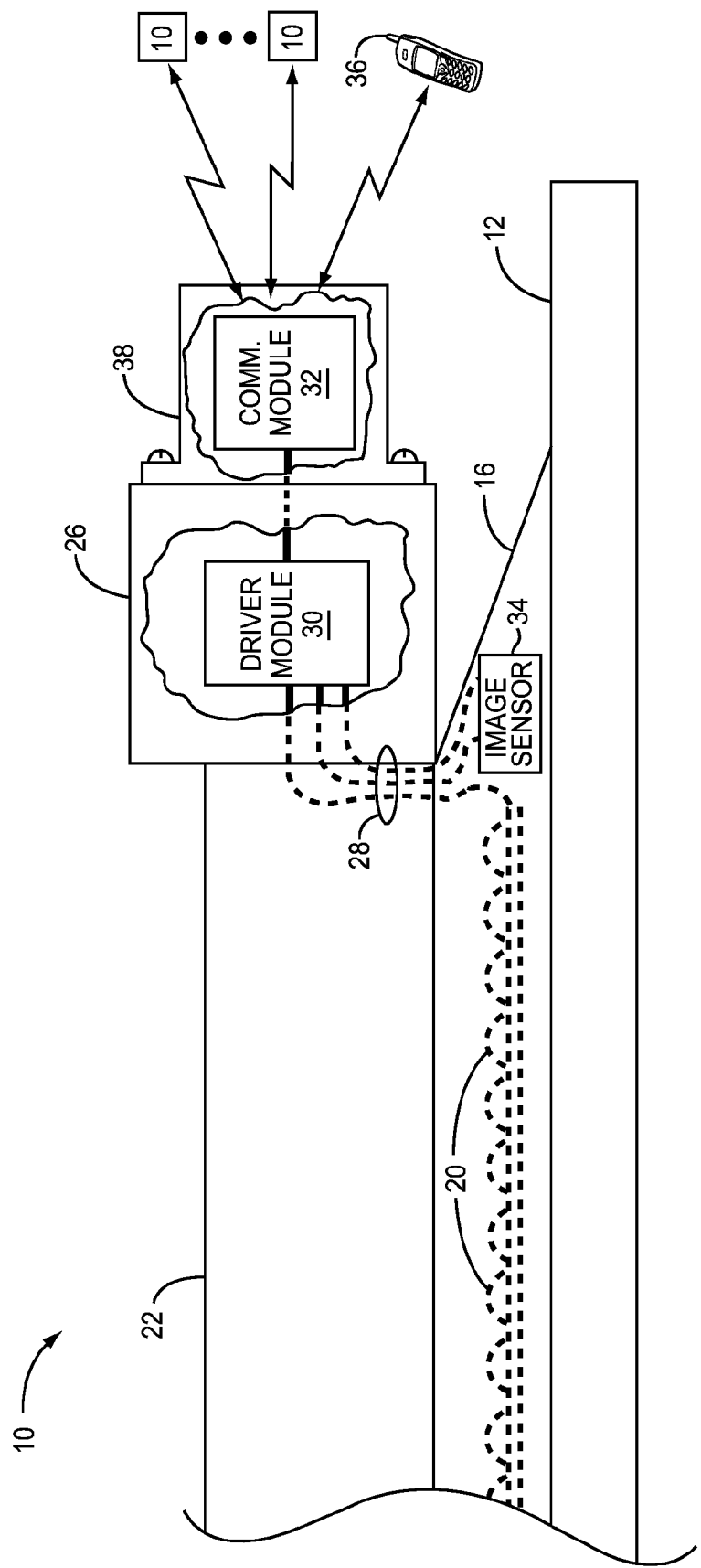
FIG. 5 illustrates a driver module provided in an electronics housing of the lighting fixture of FIG. 1 and a communications module in an associated housing coupled to the exterior of the electronics housing according to one embodiment of the disclosure.

With the embodiment of FIG. 4, adding or replacing the communications module 32 requires gaining access to the interior of the electronics housing 26. If this is undesirable, the driver module 30 may be provided alone in the electronics housing 26. The communications module 32 may be mounted outside of the electronics housing 26 in an exposed fashion or within a supplemental housing 38, which may be directly or indirectly coupled to the outside of the electronics housing 26, as shown in FIG. 5. The supplemental housing 38 may be bolted to the electronics housing 26. The supplemental housing 38 may alternatively be connected to the electronics housing using snap-fit or hook-and-snap mechanisms. The supplemental housing 38, alone or when coupled to the exterior surface of the electronics housing 26, may provide a plenum rated enclosure.

In embodiments where the electronics housing 26 and the supplemental housing 38 will be mounted within a plenum rated enclosure, the supplemental housing 38 may not need to be plenum rated. Further, the communications module 32 may be directly mounted to the exterior of the electronics housing 26 without any need for a supplemental housing 38, depending on the nature of the electronics provided in the communications module 32, how and where the lighting fixture 10 will be mounted, and the like.

The latter embodiment, wherein the communications module 32 is mounted outside of the electronics housing 26, may prove beneficial when the communications module 32 facilitates wireless communications with the other lighting fixtures 10, the remote control system, or other network or auxiliary device. In essence, the driver module 30 may be provided in the plenum rated electronics housing 26, which may not be conducive to wireless communications. The communications module 32 may be mounted outside of the electronics housing 26 by itself or within the supplemental housing 38 that is designed to be more conducive to wireless communications. A cable may be provided between the driver module 30 and the communications module 32 according to a defined communication interface. As an alternative, which is described in detail further below, the driver module 30 may be equipped with a first connector that is accessible through the wall of the electronics housing 26. The communications module 32 may have a second connector, which mates with the first connector to facilitate communications between the driver module 30 and the communications module 32.

The embodiments that employ mounting the communications module 32 outside of the electronics housing 26 may be somewhat less cost effective, but provide significant flexibility in allowing the communications module 32 or other auxiliary devices to be added to the lighting fixture 10, serviced, or replaced. The supplemental housing 38 for the communications module 32 may be made of a plenum rated plastic or metal, and may be configured to readily mount to the electronics housing 26 through snaps, screws, bolts, or the like, as well as receive the communications module 32. The communications module 32 may be mounted to the inside of the supplemental housing 38 through snap-fits, screws, twistlocks, and the like. The cabling and connectors used for connecting the communications module 32 to the driver module 30 may take any available form, such as with standard category 5/6 (cat 5/6) cable having RJ45 connectors, edge card connectors, blind mate connector pairs, terminal blocks and individual wires, and the like. Having an externally mounted communications module 32 relative to the electronics housing 26 that includes the driver module 30 allows for easy field installation of different types of communications modules 32 or modules with other functionality for a given driver module 30.

As illustrated in FIG. 5, the communications module 32 is mounted within the supplemental housing 38. The supplemental housing 38 is attached to the electronics housing 26 with bolts. As such, the communications module 32 is readily attached and removed via the illustrated bolts. Thus, a screwdriver, ratchet, or wrench, depending on the type of head for the bolts, is required to detach or remove the communications module 32 via the supplemental housing 38.

Figure 6A:
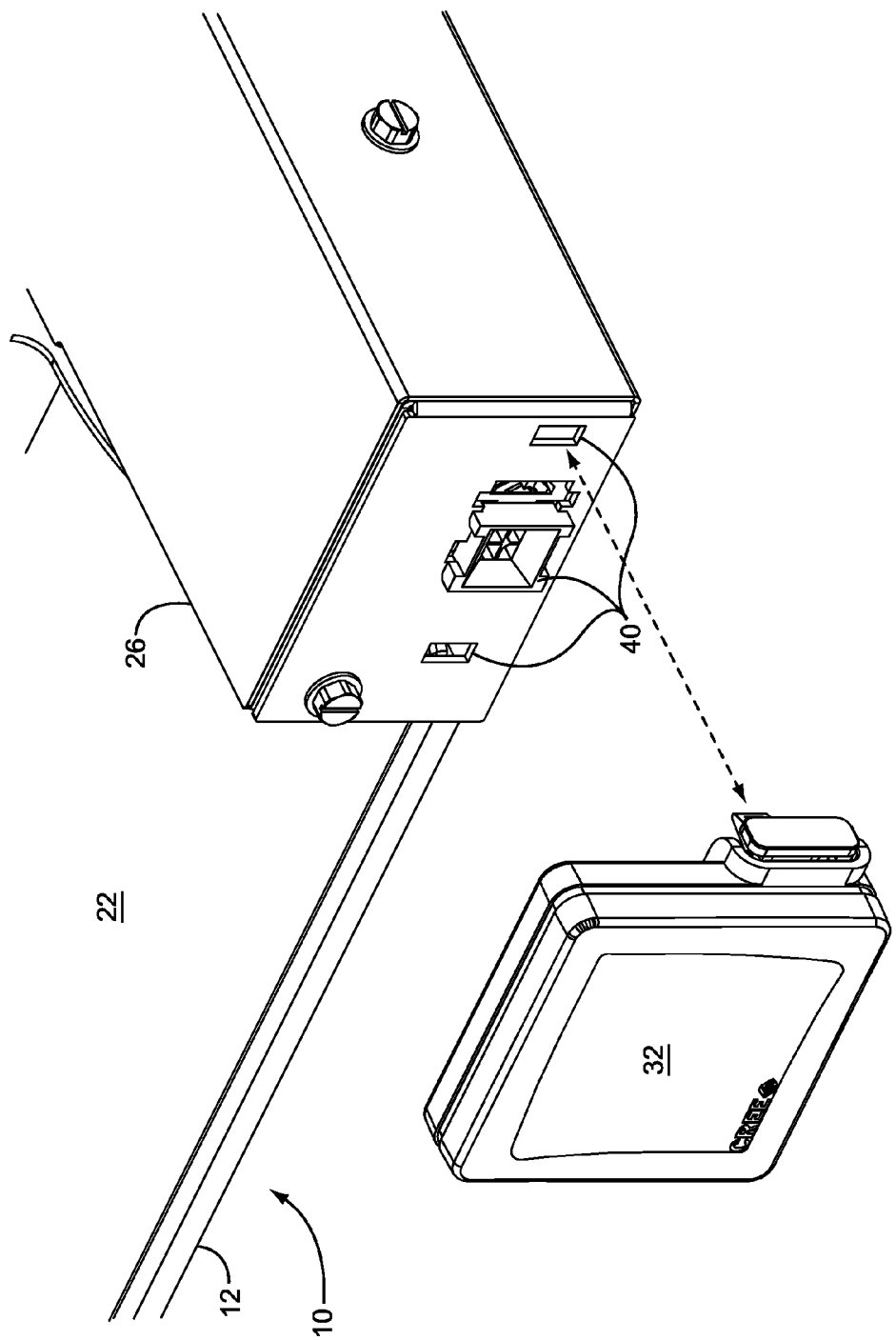
FIGS. 6A and 6B respectively illustrate a communications module according to one embodiment, before and after being attached to the housing of the lighting fixture.
Figure 6B:
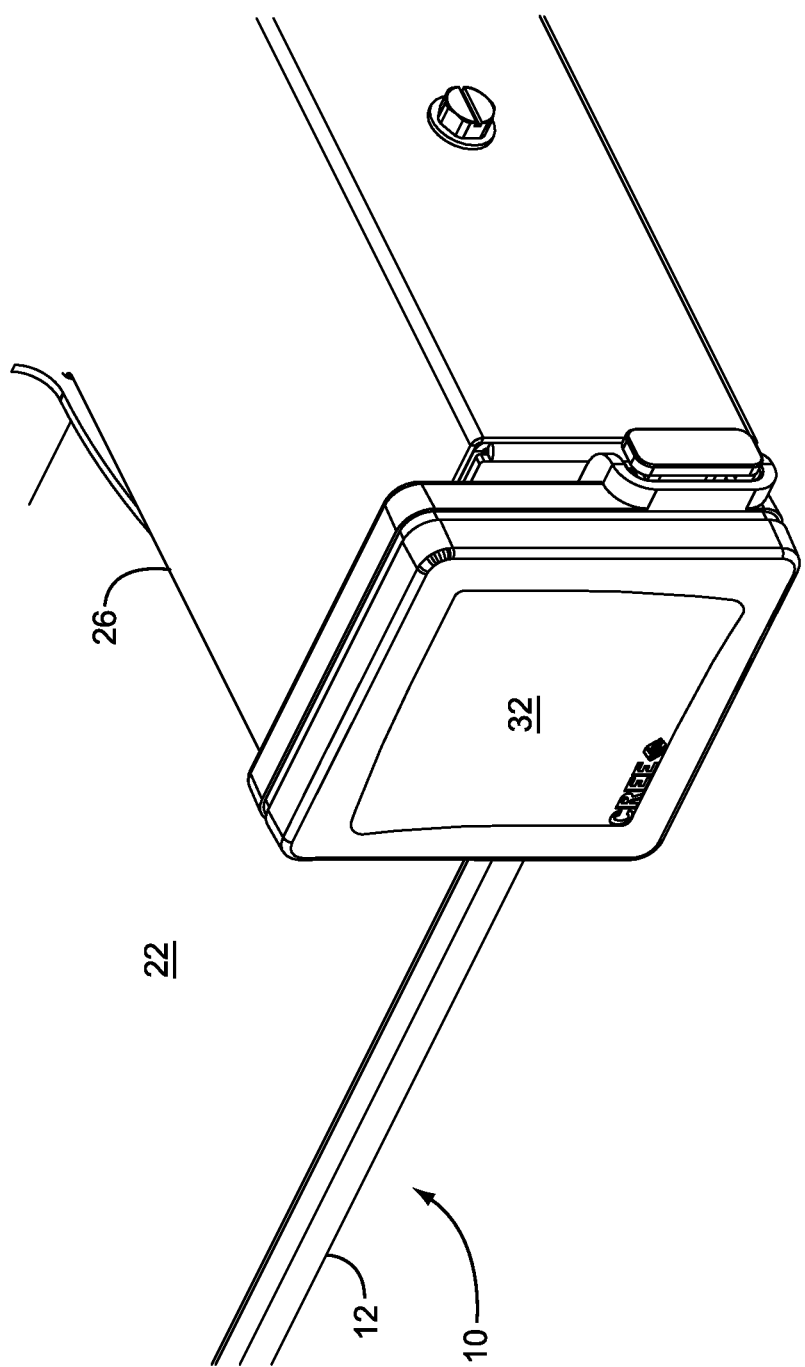

As an alternative, the communications module 32 may be configured as illustrated in FIGS. 6A and 6B. In this configuration, the communications module 32 may be attached to the electronics housing 26 of the lighting fixture 10 in a secure fashion and may subsequently be released from the electronics housing 26 without the need for bolts using available snap-lock connectors, such as illustrated in U.S. patent application Ser. No. 13/868,021, which was previously incorporated by reference. Notably, the rear of the communication module housing includes a male (or female) snap-lock connector (not shown), which is configured to securely and releasable engage a complementary female (or male) snap-lock connector 40 on the electronics housing 26.

FIG. 6A illustrates the communications module 32 prior to being attached to or just after being released from the electronics housing 26 of the lighting fixture 10. One surface of the electronics housing 26 of the lighting fixture 10 includes the snap-lock connector 40, which includes a female electrical connector that is flanked by openings that extend into the electronics housing 26 of the lighting fixture 10. The openings correspond in size and location to the locking members (not shown) on the back of the communications module 32. Further, the female electrical connector leads to or is coupled to a PCB of the electronics for the driver module 30. In this example, the male electrical connector of the communications module 32 is configured to engage the female electrical connector, which is mounted in the electronics housing 26 of the lighting fixture 10.

As the communications module 32 is snapped into place on the electronics housing 26 of the lighting fixture 10, as illustrated in FIG. 6B, the male electrical connector of the communications module 32 will engage the female electrical connector of the driver module 30 as the fixture locking members of the communications module 32 engage the respective openings of the locking interfaces in the electronics housing 26. At this point, the communications module 32 is snapped into place to the electronics housing 26 of the lighting fixture 10, and the respective male and female connectors of the communications module 32 and the driver module 30 are fully engaged.

Figure 7A:
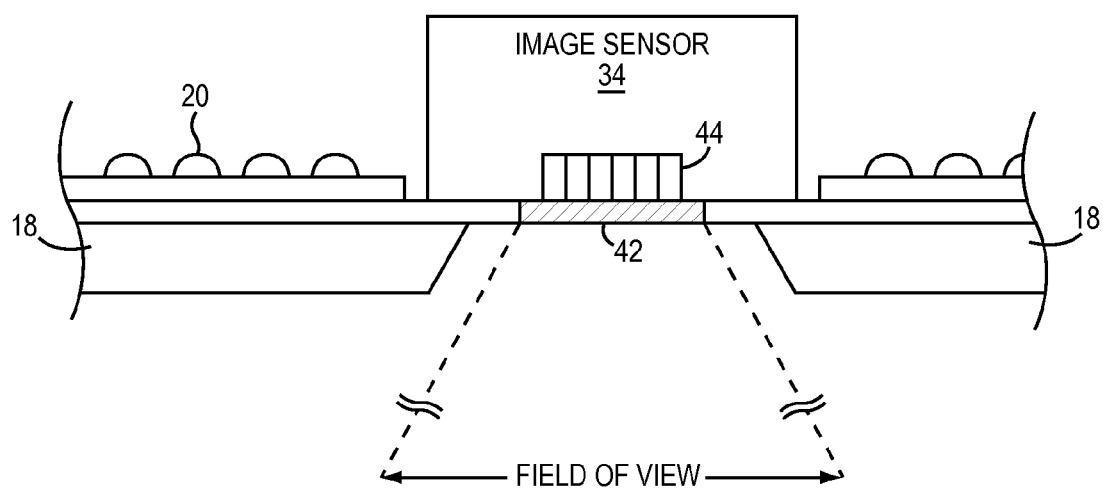
FIGS. 7A and 7B illustrate an image module installed in a heatsink of a lighting fixture according to one embodiment of the disclosure.
Figure 7B:
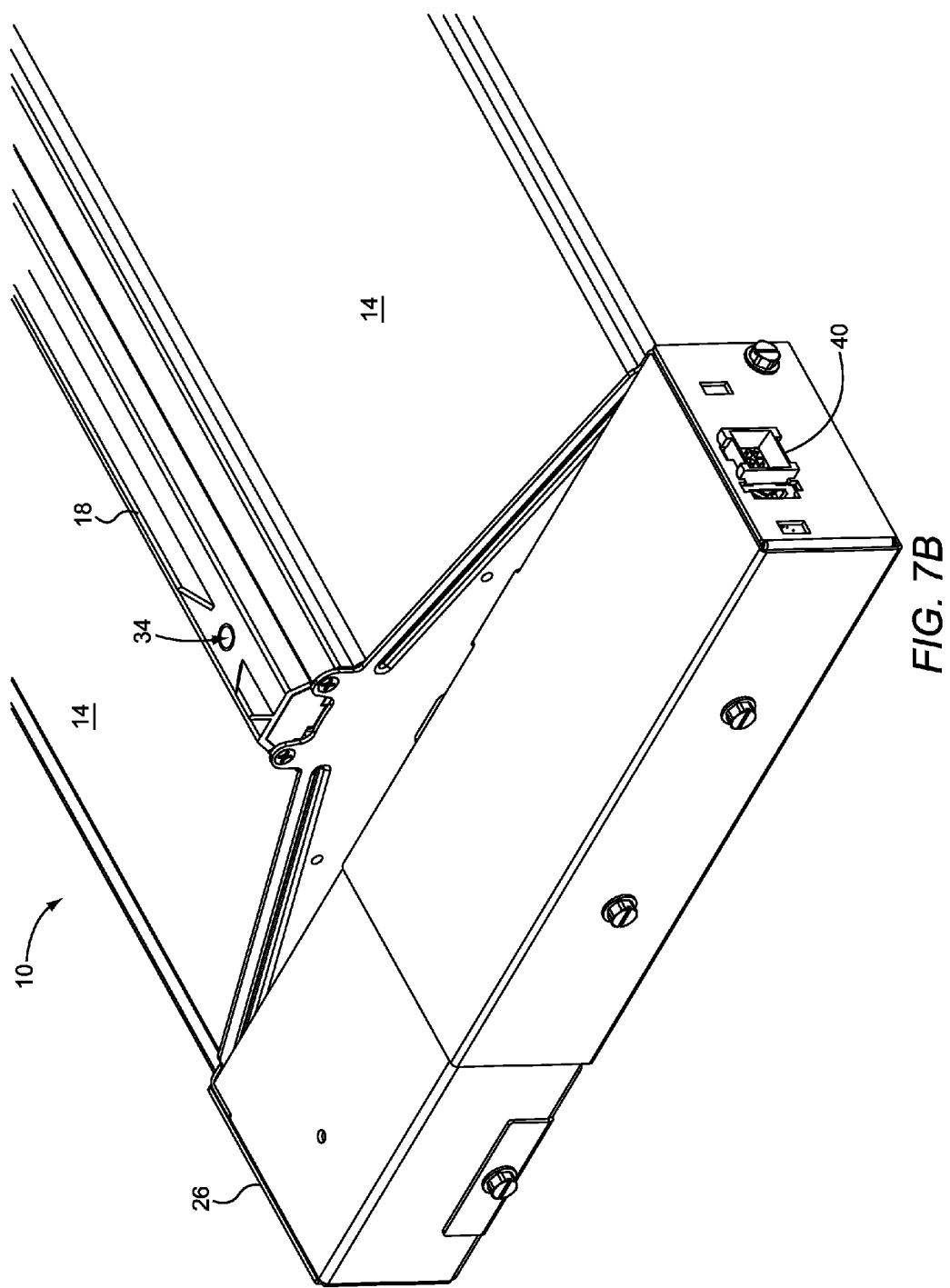

With reference to FIGS. 7A and 7B, one embodiment of the lighting fixture 10 is illustrated where the image sensor 34 is integrated with the heatsink 18. The image sensor 34 is shown mounted to the back (top) side of the heatsink 18 along with the LED array 20. A lens 42 or opening is provided in the heatsink 18 such that the front surface of the lens 42 is flush with the front surface of the heatsink 18. A pixel array 44 of the image sensor 34 is aligned with the lens 42 such that the pixel array 44 is exposed to a field of view through the lens 42 in the heatsink 18. As illustrated, a portion of the heatsink 18 is contoured to accommodate the lens 42 and ensure that the field of view is not obstructed. Notably, the image sensor 34 need not be mounted to the heatsink 18. The image sensor 34 may be mounted on any part of the lighting fixture 10 that affords the pixel array 44 access to an appropriate field of view.

Figure 8A:
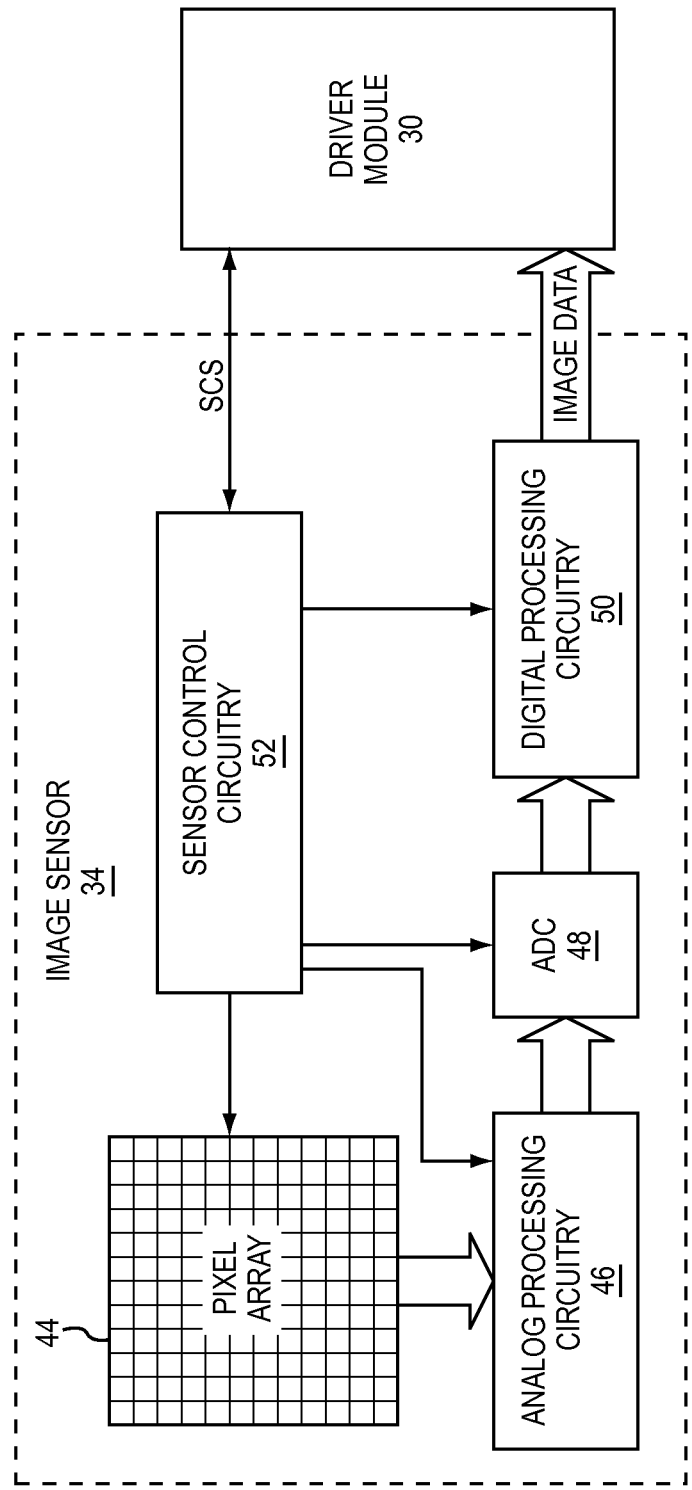
FIG. 8A illustrates an image sensor according to one embodiment of the disclosure.
Figure 8B:
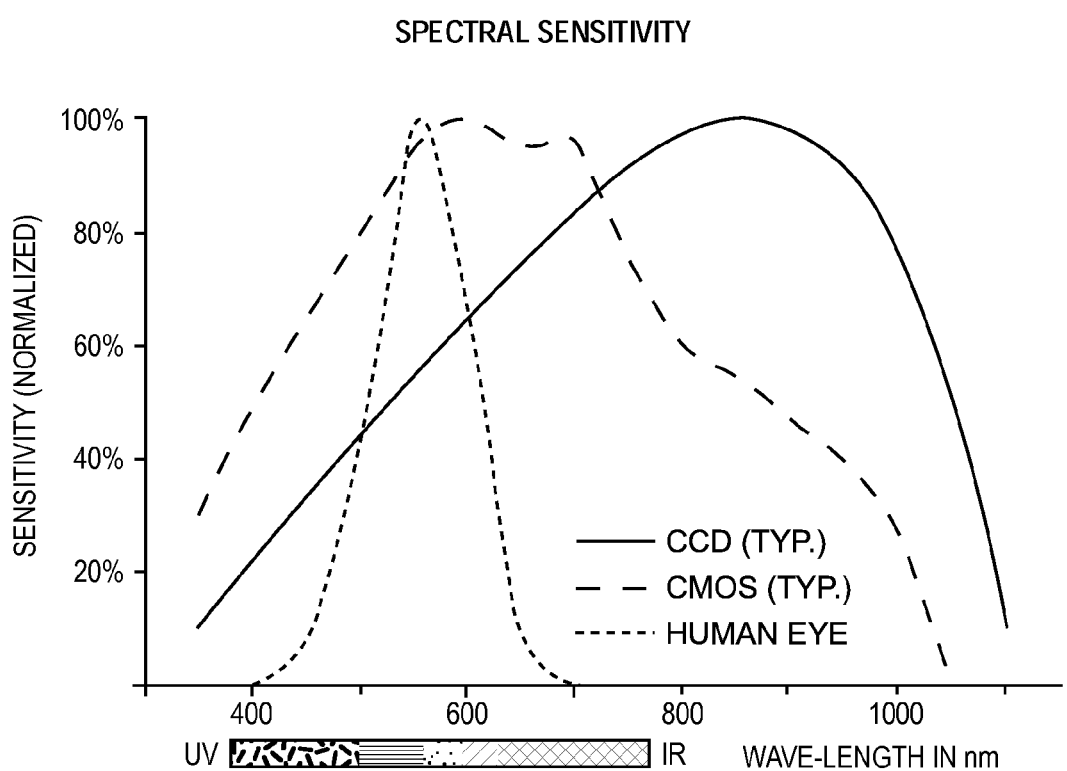
FIG. 8B is a graph of spectral sensitivity with respect to light for a typical CCD image sensor, a typical CMOS image sensor, and the human eye.

An exemplary CMOS-based image sensor 34 is shown in FIG. 8A. While a CMOS-based image sensor 34 is illustrated, those skilled in the art will appreciate that other types of image sensors 34, such as CCD-based sensors, may be employed. CMOS-based image sensors 34 are particularly useful in lighting applications because they have a broad spectral sensitivity that overlaps that of the human eye. As illustrated in FIG. 8B, the spectral sensitivity of the human eye is relatively narrow and centered around 560 nm. The spectral sensitivity of CMOS-based image sensors 34 is much broader, yet substantially overlaps that of the human eye and extends toward the red and infrared (IR) end of the spectrum. The spectral sensitivity of the CCD-based image sensor 34 is relatively broad, but does not overlap that of the human eye as well as its CMOS counterpart.

The image sensor 34 generally includes the pixel array 44, analog processing circuitry 46, an analog-to-digital converter (ADC) 48, digital processing circuitry 50, and sensor control circuitry 52. In operation, the pixel array 44 will receive an instruction to capture an image from the sensor control circuitry 52. In response, the pixel array 44 will transform the light that is detected at each pixel into an analog signal and pass the analog signals for each pixel of the pixel array 44 to the analog processing circuitry 46. The analog processing circuitry 46 will filter and amplify the analog signals to create amplified signals, which are converted to digital signals by the ADC 48. The digital signals are processed by the digital processing circuitry 50 to create image data for the captured image. The image data is passed to the driver module 30 for analysis, storage, or delivery to another lighting fixture 10 or remote entity via the communications module 32.

The sensor control circuitry 52 will cause the pixel array 44 to capture an image in response to receiving an instruction via a sensor control signal (SCS) from the driver module 30 or other control entity. The sensor control circuitry 52 controls the timing of the image processing provided by the analog processing circuitry 46, ADC 48, and digital processing circuitry 50. The sensor control circuitry 52 also sets the image sensor's processing parameters, such as the gain and nature of filtering provided by the analog processing circuitry 46 as well as the type of image processing provided by the digital processing circuitry 50. These processing parameters may be dictated by information provided by the driver module 30.

Figure 9:
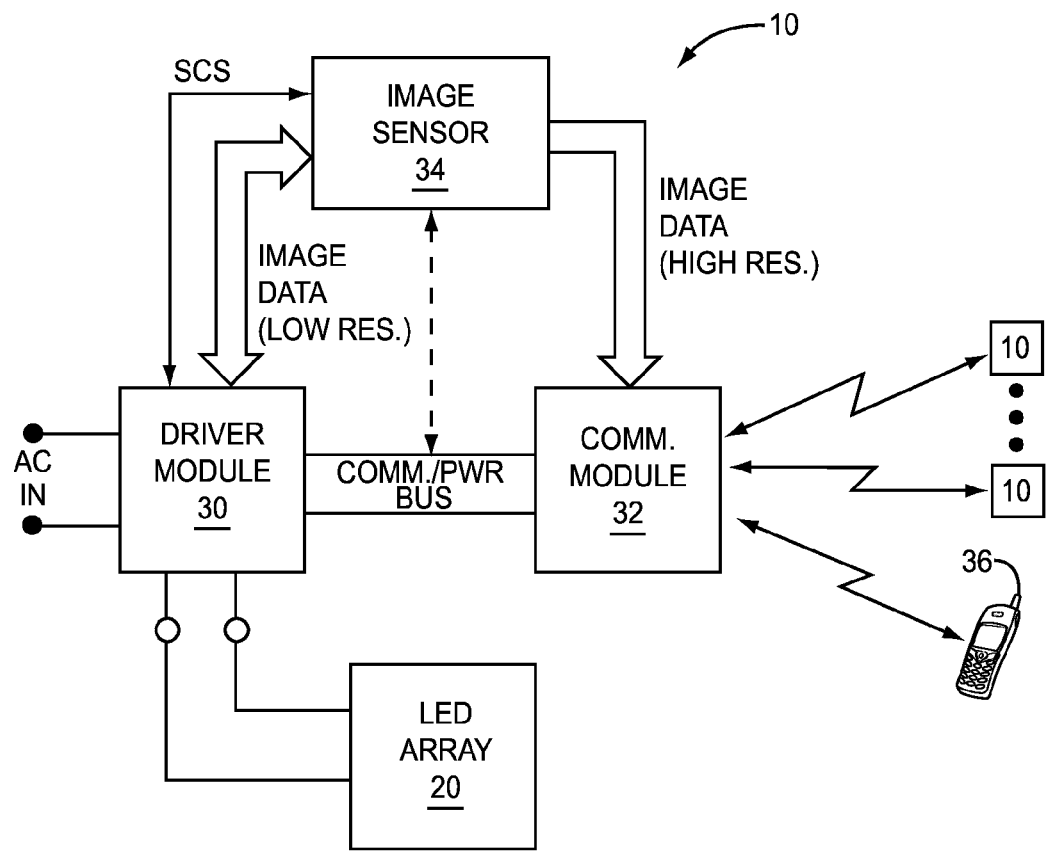
FIG. 9 is a block diagram of a lighting system according to one embodiment of the disclosure.

Turning now to FIG. 9, an electrical block diagram of a lighting fixture 10 is provided according to one embodiment. Assume for purposes of discussion that the driver module 30, communications module 32, and LED array 20 are ultimately connected to form the core electronics of the lighting fixture 10, and that the communications module 32 is configured to bidirectionally communicate with other lighting fixtures 10, the commissioning tool 36, or other control entity through wired or wireless techniques. In this embodiment, a standard communication interface and a first, or standard, protocol are used between the driver module 30 and the communications module 32. This standard protocol allows different driver modules 30 to communicate with and be controlled by different communications modules 32, assuming that both the driver module 30 and the communications module 32 are operating according to the standard protocol used by the standard communication interface. The term "standard protocol" is defined to mean any type of known or future developed, proprietary, or industry-standardized protocol.

In the illustrated embodiment, the driver module 30 and the communications module 32 are coupled via communication and power buses, which may be separate or integrated with one another. The communication bus allows the communications module 32 to receive information from the driver module 30 as well as control the driver module 30. An exemplary communication bus is the well-known inter-integrated circuitry ($I^2C$) bus, which is a serial bus and is typically implemented with a two-wire interface employing data and clock lines. Other available buses include: serial peripheral interface (SPI) bus, Dallas Semiconductor Corporation's 1-Wire serial bus, universal serial bus (USB), RS-232, Microchip Technology Incorporated's UNI/O®, and the like.

In certain embodiments, the driver module 30 includes sufficient electronics to process an alternating current (AC) input signal (AC IN) and provide an appropriate rectified or direct current (DC) signal sufficient to power the communications module 32, and perhaps the LED array 20. As such, the communications module 32 does not require separate AC-to-DC conversion circuitry to power the electronics residing therein, and can simply receive DC power from the driver module 30 over the power bus. Similarly, the image sensor 34 may receive power directly from the driver module 30 or via the power bus, which is powered by the driver module 30 or other source. The image sensor 34 may also be coupled to a power source (not shown) independently of the driver and communications modules 30, 32.

In one embodiment, one aspect of the standard communication interface is the definition of a standard power delivery system. For example, the power bus may be set to a low voltage level, such as 5 volts, 12 volts, 24 volts, or the like. The driver module 30 is configured to process the AC input signal to provide the defined low voltage level and provide that voltage over the power bus, thus the communications module 32 or auxiliary devices, such as the image sensor 34, may be designed in anticipation of the desired low voltage level being provided over the power bus by the driver module 30 without concern for connecting to or processing an AC signal to a DC power signal for powering the electronics of the communications module 32 or the image sensor 34.

Figure 10:
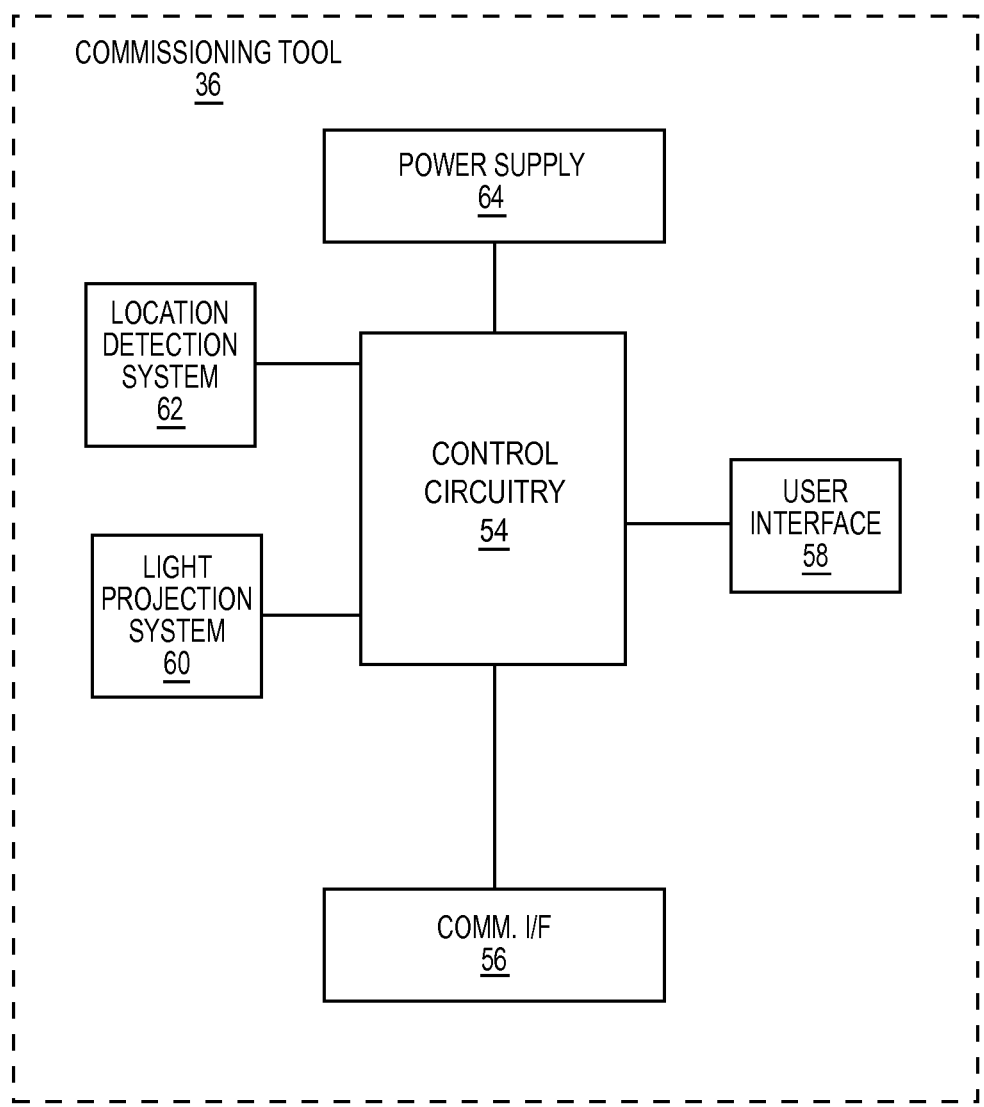
FIG. 10 is a block diagram of the electronics for a commissioning tool, according to one embodiment.

With reference to FIG. 10, electronics for the commissioning tool 36 may include control circuitry 54 that is associated with a communication interface 56, a user interface 58, a light projection system 60, a location detection system 62, and a power supply 64. The control circuitry 54 is based on one or more application-specific integrated circuits, microprocessors, microcontrollers, or like hardware, which are associated with sufficient memory to run the firmware, hardware, and software necessary to impart the functionality described herein.

Everything may be powered by the power supply 64, which may include a battery and any necessary DC-DC conversion circuitry to convert the battery voltage to the desired voltages for powering the various electronics. The user interface 58 may include any combination of buttons, keypads, displays, or touch screens that supports the display of information to the user and the input of information by a user.

The communication interface 56 may facilitate wired or wireless communications with the lighting fixtures 10 directly or indirectly via an appropriate wireless network. The communication interface 56 may also be used to facilitate wireless communications with a personal computer, wireless network (WLAN), and the like. Virtually any communication standard may be employed to facilitate such communications, including Bluetooth, IEEE 802.11 (wireless LAN), near field, cellular, and the like wireless communication standards. For wired communications, the communication interface 56 may be used to communicate with a personal computer, wired network (LAN), lighting fixtures 10, and the like via an appropriate cable.

The light projection system 60 may take various forms, such as a laser diode or light emitting diode that is capable of emitting a light signal that can be received by the lighting fixtures 10 via the image sensor 34, a traditional ambient light sensor, or the like. The light projection system 60 may be used to transmit a focused light signal that can be directed at and recognized by a specific lighting fixture 10 to select the lighting fixture 10. The selected lighting fixture 10 and the commissioning tool 36 can then start communicating with each other via the communication interface 56 to exchange information and allow the instructions and data to be uploaded to the lighting fixture 10. In other embodiments, the commissioning tool 36 may query the addresses of the lighting fixtures 10 and systematically instruct the lighting fixtures 10 to control their light outputs to help identify each lighting fixture 10. Once the right lighting fixture 10 is identified, the commissioning tool 36 can begin configuring or controlling the lighting fixture 10 as desired. All of the control circuitry discussed herein for the lighting fixtures 10 and commissioning tool 36 is defined as hardware based and configured to run software, firmware, and the like to implement the described functionality.

Figure 11:
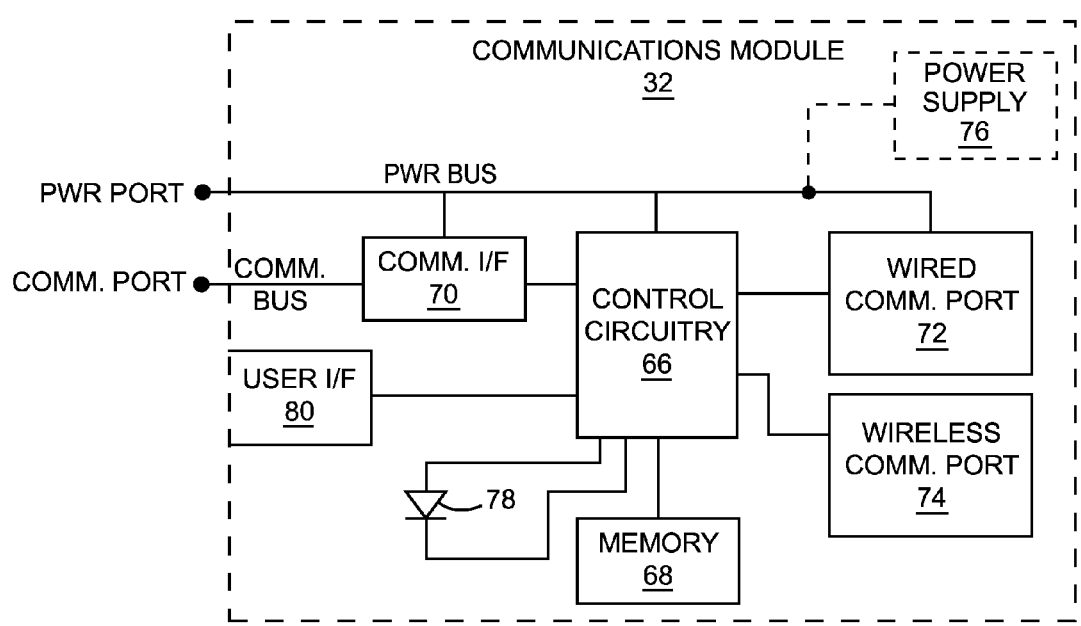
FIG. 11 is a block diagram of a communications module according to one embodiment of the disclosure.

With reference to FIG. 11, a block diagram of one embodiment of the communications module 32 is illustrated. The communications module 32 includes control circuitry 66 and associated memory 68, which contains the requisite software instructions and data to facilitate operation as described herein. The control circuitry 66 may be associated with a communication interface 70, which is to be coupled to the driver module 30, directly or indirectly via the communication bus. The control circuitry 66 may be associated with a wired communication port 72, a wireless communication port 74, or both, to facilitate wired or wireless communications with other lighting fixtures 10, the commissioning tool 36, and remote control entities. The wireless communication port 74 may include the requisite transceiver electronics to facilitate wireless communications with remote entities. The wired communication port 72 may support universal serial (USB), Ethernet, or like interfaces.

Image data may be provided directly to the driver module 30, communication module 32, or both. For example, low resoluation image data for ambient light or occupancy determination may be provided to the driver module 30 for processing. High resolution image data could be sent to the communication module 32 for delivery to a security center so that security personnel can monitor high resolution images.

The capabilities of the communications module 32 may vary greatly from one embodiment to another. For example, the communications module 32 may act as a simple bridge between the driver module 30 and the other lighting fixtures 10 or remote control entities. In such an embodiment, the control circuitry 66 will primarily pass data and instructions received from the other lighting fixtures 10 or remote control entities to the driver module 30, and vice versa. The control circuitry 66 may translate the instructions as necessary based on the protocols being used to facilitate communications between the driver module 30 and the communications module 32 as well as between the communications module 32 and the remote control entities.

In other embodiments, the control circuitry 66 plays an important role in coordinating intelligence and sharing data among the lighting fixtures 10 as well as providing significant, if not complete, control of the driver module 30. While the communications module 32 may be able to control the driver module 30 by itself, the control circuitry 66 may also be configured to receive data and instructions from the other lighting fixtures 10 or remote control entities and use this information to control the driver module 30. The communications module 32 may also provide instructions to other lighting fixtures 10 and remote control entities based on the sensor data from the associated driver module 30 as well as the sensor data and instructions received from the other lighting fixtures 10 and remote control entities.

Power for the control circuitry 66, memory 68, the communication interface 70, and the wired and/or wireless communication ports 72 and 74 may be provided over the power bus via the power port. As noted above, the power bus may receive its power from the driver module 30, which generates the DC power signal. As such, the communications module 32 may not need to be connected to AC power or include rectifier and conversion circuitry. The power port and the communication port may be separate or may be integrated with the standard communication interface. The power port and communication port are shown separately for clarity. In one embodiment, the communication bus is a 2-wire serial bus, wherein the connector or cabling configuration may be configured such that the communication bus and the power bus are provided using four wires: data, clock, power, and ground. In alternative embodiments, an internal power supply 76, which is associated with AC power or a battery is used to supply power.

The communications module 32 may have a status indicator, such as an LED 78 to indicate the operating state of the communication module. Further, a user interface 80 may be provided to allow a user to manually interact with the communications module 32. The user interface 80 may include an input mechanism, an output mechanism, or both. The input mechanism may include one or more of buttons, keys, keypads, touchscreens, or the like. The output mechanism may include one more LEDs, a display, or the like. For the purposes of this application, a button is defined to include a push button switch, all or part of a toggle switch, rotary dial, slider, or any other mechanical input mechanism.

Figure 12:
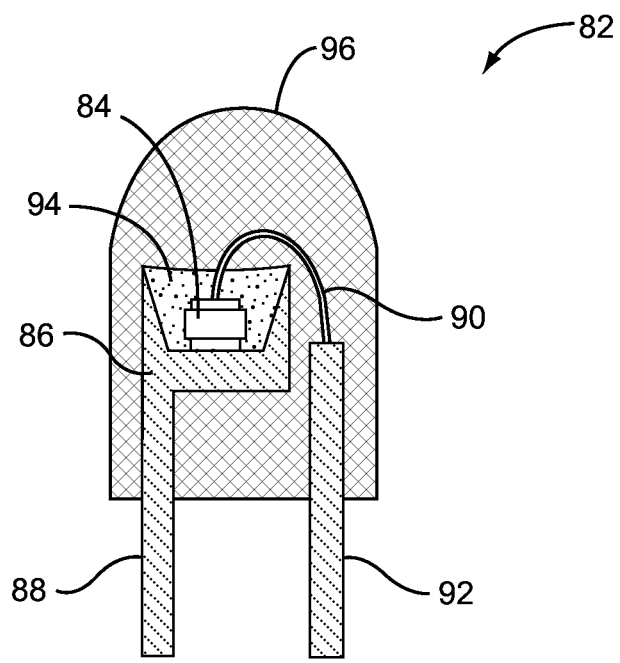
FIG. 12 is a cross-section of an exemplary LED according to a first embodiment of the disclosure.

A description of an exemplary embodiment of the LED array 20, driver module 30, and the communications module 32 follows. As noted, the LED array 20 includes a plurality of LEDs, such as the LEDs 82 illustrated in FIGS. 12 and 13. With reference to FIG. 12, a single LED chip 84 is mounted on a reflective cup 86 using solder or a conductive epoxy, such that ohmic contacts for the cathode (or anode) of the LED chip 84 are electrically coupled to the bottom of the reflective cup 86. The reflective cup 86 is either coupled to or integrally formed with a first lead 88 of the LED 82. One or more bond wires 90 connect ohmic contacts for the anode (or cathode) of the LED chip 84 to a second lead 92.

The reflective cup 86 may be filled with an encapsulant material 94 that encapsulates the LED chip 84. The encapsulant material 94 may be clear or contain a wavelength conversion material, such as a phosphor, which is described in greater detail below. The entire assembly is encapsulated in a clear protective resin 96, which may be molded in the shape of a lens to control the light emitted from the LED chip 84.

Figure 13:
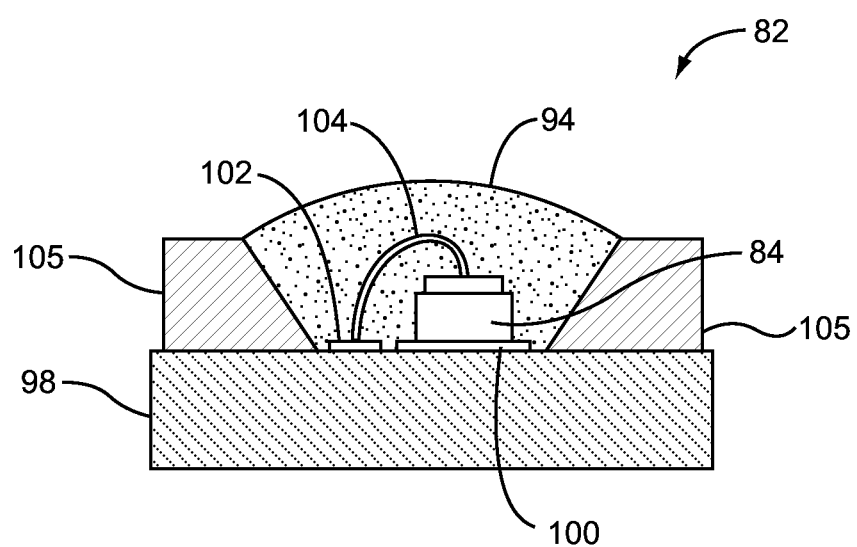
FIG. 13 is a cross-section of an exemplary LED according to a second embodiment of the disclosure.

An alternative package for an LED 82 is illustrated in FIG. 13 wherein the LED chip 84 is mounted on a substrate 98. In particular, the ohmic contacts for the anode (or cathode) of the LED chip 84 are directly mounted to first contact pads 100 on the surface of the substrate 98. The ohmic contacts for the cathode (or anode) of the LED chip 84 are connected to second contact pads 102, which are also on the surface of the substrate 98, using bond wires 104. The LED chip 84 resides in a cavity of a reflector structure 105, which is formed from a reflective material and functions to reflect light emitted from the LED chip 84 through the opening formed by the reflector structure 105. The cavity formed by the reflector structure 105 may be filled with an encapsulant material 94 that encapsulates the LED chip 84. The encapsulant material 94 may be clear or contain a wavelength conversion material, such as a phosphor.

In either of the embodiments of FIGS. 12 and 13, if the encapsulant material 94 is clear, the light emitted by the LED chip 84 passes through the encapsulant material 94 and the protective resin 96 without any substantial shift in color. As such, the light emitted from the LED chip 84 is effectively the light emitted from the LED 82. If the encapsulant material 94 contains a wavelength conversion material, substantially all or a portion of the light emitted by the LED chip 84 in a first wavelength range may be absorbed by the wavelength conversion material, which will responsively emit light in a second wavelength range. The concentration and type of wavelength conversion material will dictate how much of the light emitted by the LED chip 84 is absorbed by the wavelength conversion material as well as the extent of the wavelength conversion. In embodiments where some of the light emitted by the LED chip 84 passes through the wavelength conversion material without being absorbed, the light passing through the wavelength conversion material will mix with the light emitted by the wavelength conversion material. Thus, when a wavelength conversion material is used, the light emitted from the LED 82 is shifted in color from the actual light emitted from the LED chip 84.

For example, the LED array 20 may include a group of BSY or BSG LEDs 82 as well as a group of red LEDs 82. BSY LEDs 82 include an LED chip 84 that emits bluish light, and the wavelength conversion material is a yellow phosphor that absorbs the blue light and emits yellowish light. Even if some of the bluish light passes through the phosphor, the resultant mix of light emitted from the overall BSY LED 82 is yellowish light. The yellowish light emitted from a BSY LED 82 has a color point that falls above the Black Body Locus (BBL) on the 1976 CIE chromaticity diagram wherein the BBL corresponds to the various color temperatures of white light.

Similarly, BSG LEDs 82 include an LED chip 84 that emits bluish light; however, the wavelength conversion material is a greenish phosphor that absorbs the blue light and emits greenish light. Even if some of the bluish light passes through the phosphor, the resultant mix of light emitted from the overall BSG LED 82 is greenish light. The greenish light emitted from a BSG LED 82 has a color point that falls above the BBL on the 1976 CIE chromaticity diagram wherein the BBL corresponds to the various color temperatures of white light.

The red LEDs 82 generally emit reddish light at a color point on the opposite side of the BBL as the yellowish or greenish light of the BSY or BSG LEDs 82. As such, the reddish light from the red LEDs 82 may mix with the yellowish or greenish light emitted from the BSY or BSG LEDs 82 to generate white light that has a desired color temperature and falls within a desired proximity of the BBL. In effect, the reddish light from the red LEDs 82 pulls the yellowish or greenish light from the BSY or BSG LEDs 82 to a desired color point on or near the BBL. Notably, the red LEDs 82 may have LED chips 84 that natively emit reddish light wherein no wavelength conversion material is employed. Alternatively, the LED chips 84 may be associated with a wavelength conversion material, wherein the resultant light emitted from the wavelength conversion material and any light that is emitted from the LED chips 84 without being absorbed by the wavelength conversion material mixes to form the desired reddish light.

The blue LED chip 84 used to form either the BSY or BSG LEDs 82 may be formed from a gallium nitride (GaN), indium gallium nitride (InGaN), silicon carbide (SiC), zinc selenide (ZnSe), or like material system. The red LED chip 84 may be formed from an aluminum indium gallium nitride (AlInGaP), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 14:
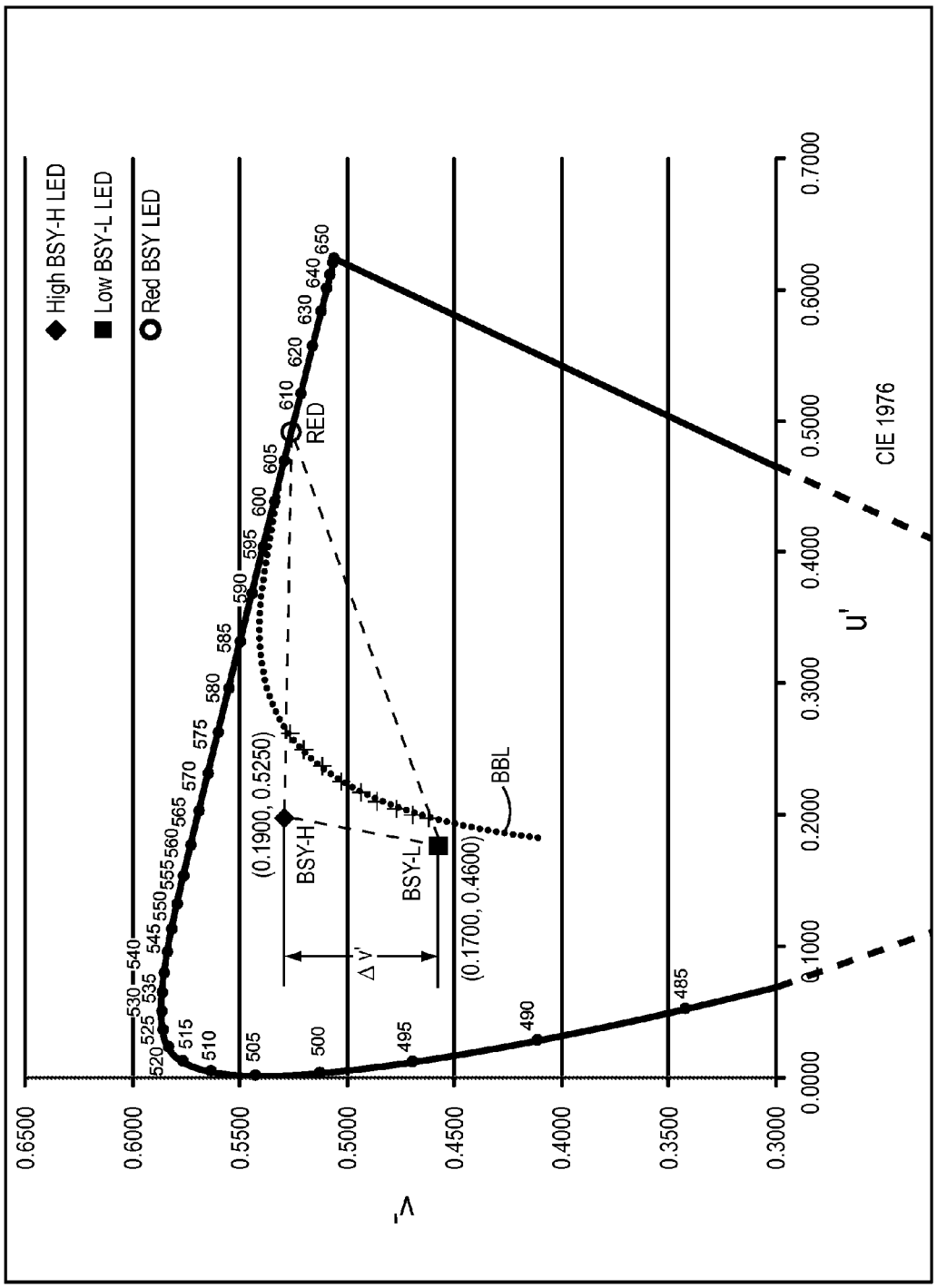
FIG. 14 is CIE 1976 chromaticity diagram that illustrates the color points for three different LEDs and a black body locus.

The International Commission on Illumination (Commission internationale de l'éclairage, or CIE) has defined various chromaticity diagrams over the years. The chromaticity diagrams are used to project a color space that represents all human perceivable colors without reference to brightness or luminance. FIG. 14 illustrates a CIE 1976 chromaticity diagram, which includes a portion of a Planckian locus, or black body locus (BBL). The BBL is a path within the color space that the color of an incandescent black body would travel as the temperature of the black body changes. While the color of the incandescent body may range from an orangish-red to blue, the middle portions of the path encompass what is traditionally considered as "white light."

Correlated Color Temperature (CCT), or color temperature, is used to characterize white light. CCT is measured in kelvin (K) and defined by the Illuminating Engineering Society of North America (IESNA) as "the absolute temperature of a blackbody whose chromaticity most nearly resembles that of the light source." Light output that is:
 below 3200 K is a yellowish white and generally considered to be warm (white) light;
 between 3200 K and 4000 K is generally considered neutral (white) light; and
 above 4000 K is bluish-white and generally considered to be cool (white) light.

In the following discussion, the focus is providing white light with a desired CCT, which is generally the primary goal for general illumination. However, the concepts discussed below equally apply to adjusting the overall color of the light provided by the lighting fixture 10 to colors that are not considered white or have color points that do not fall on or relatively close to the BBL.

The coordinates [u', v'] are used to define color points within the color space of the CIE 1976 chromaticity diagram. The v' value defines a vertical position and the u' value defines a horizontal position. As an example, the color points for a first BSY LED 82 is about (0.1900, 0.5250), a second BSY LED 82 is about (0.1700, 0.4600), and a red LED 82 is about (0.4900, 0.5600). Notably, the first and second BSY LEDs 82 are significantly spaced apart from one another along the v' axis. As such, the first BSY LED 82 is much higher than the second BSY LED 82 in the chromaticity diagram. For ease of reference, the higher, first BSY LED 82 is referenced as the high BSY-H LED, and the lower, second BSY LED 82 is referenced as the low BSY-L LED.

As such, the Δv' for the high BSY-H LED and the low BSY-L LED is about 0.065 in the illustrated example. In different embodiments, the Δv' may be greater than 0.025, 0.030, 0.033, 0.040 0.050, 0.060, 0.075, 0.100, 0.110, and 0.120, respectively. Exemplary, but not absolute upper bounds for Δv' may be 0.150, 0.175, or 0.200 for any of the aforementioned lower bounds. For groups of LEDs of a particular color, the Δv' between two groups of LEDs is the difference between the average v' values for each group of LEDs. As such, the Δv' between groups of LEDs of a particular color may also be greater than 0.030, 0.033, 0.040 0.050, 0.060, 0.075, 0.100, 0.110, and 0.120, respectively, with the same upper bounds as described above. Further, the variation of color points among the LEDs 82 within a particular group of LEDs may be limited to within a seven-, five, four, three, or two-step MacAdam ellipse in certain embodiments. In general, the greater the delta v', the larger the range through which the CCT of the white light can be adjusted along the black body locus. The closer the white light is to the black body locus, the more closely the white light will replicate that of an incandescent radiator.

In one embodiment, the LED array 20 includes a first LED group of only low BSY-L LEDs, a second LED group of only high BSY-H LEDs, and a third LED group of only red LEDs. The currents used to drive the first, second, and third LED groups may be independently controlled such that the intensity of the light output from the first, second, and third LED groups is independently controlled. As such, the light output for the first, second, and third LED groups may be blended or mixed to create a light output that has an overall color point virtually anywhere within a triangle formed by the color points of the respective low BSY-L LEDs, high BSY-H LEDs, and the red LEDs. Within this triangle resides a significant portion of the BBL, and as such, the overall color point of the light output may be dynamically adjusted to fall along the portion of the BBL that resides within the triangle (as well as virtually anywhere within the triangle).

A crosshatch pattern highlights the portion of the BBL that falls within the triangle. Adjusting the overall color point of the light output along the BBL corresponds to adjusting the CCT of the light output, which as noted above is considered white light when falling on or close to the BBL. In one embodiment, the CCT of the overall light output may be adjusted over a range from about 2700 K to about 5700 K. In another embodiment, the CCT of the overall light output may be adjusted over a range from about 3000 K to 5000 K. In yet another embodiment, the CCT of the overall light output may be adjusted over a range from about 2700 K to 5000 K. In yet another embodiment, the CCT of the overall light output may be adjusted over a range from about 3000 K to 4000 K. These variations in CCT can be accomplished while maintaining a high color rendering index value (CRI), such as a CRI equal to or greater than 90.

To be considered "white" light, the overall color point does not have to fall precisely on the BBL. Unless defined otherwise and for the purposes of this application only, a color point within a five-step MacAdam ellipse of the BBL is defined as white light on the BBL. For tighter tolerances, four, three, and two-step MacAdam ellipses may be defined.

Figure 15:
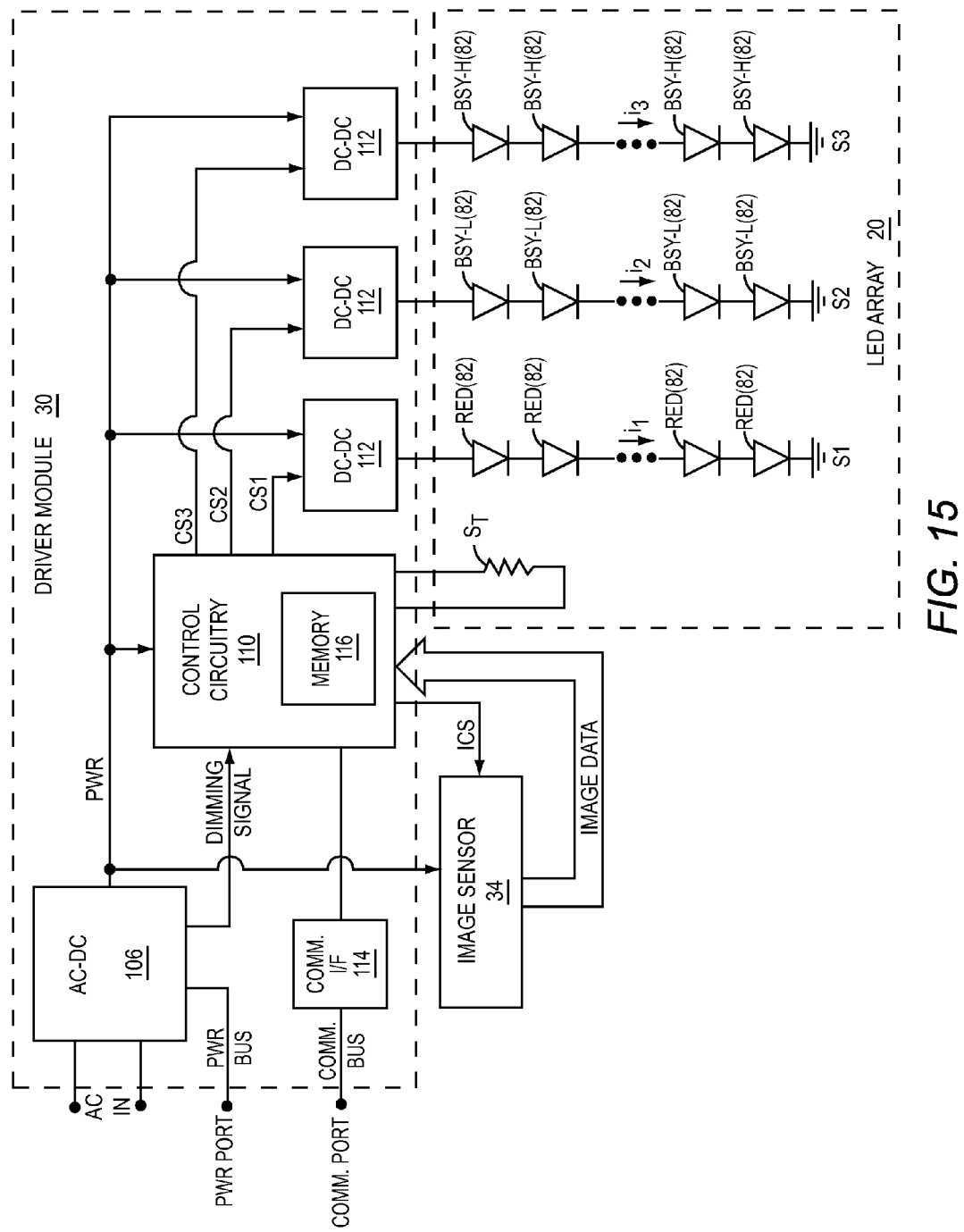
FIG. 15 is a schematic of a driver module with an image sensor and an LED array according to one embodiment of the disclosure.

In the illustrated embodiment, the LED array 20 may include a mixture of red LEDs 82, high BSY-H LEDs 82, and low BSY-L LEDs 82. The driver module 30 for driving the LED array 20 is illustrated in FIG. 15, according to one embodiment of the disclosure. The LED array 20 may be divided into multiple strings of series connected LEDs 82. In essence, LED string S1, which includes a number of red LEDs (RED), forms a first group of LEDs 82. LED string S2, which includes a number of low BSY LEDs (BSY-L), forms a second group of LEDs 82. And, LED string S3, which includes a number of high BSY LEDs (BSY-H), forms a third group of LEDs 82.

For clarity, the various LEDs 82 of the LED array 20 are referenced as RED, BSY-L, and BSY-H in FIG. 15 to clearly indicate which LEDs are located in the various LED strings S1, S2, and S3. While BSY LEDs 82 are illustrated, BSG or other phosphor-coated, wavelength converted LEDs may be employed in analogous fashion. For example, a string of high BSG-H LEDs 82 may be combined with a string of low BSG-L LEDs 82, and vice versa. Further, a string of low BSY-H LEDs may be combined with a string of high BSG-H LEDs, and vice versa. Non-phosphor-coated LEDs, such as non-wavelength converted red, green, and blue LEDs, may also be employed in certain embodiments.

In general, the driver module 30 controls the drive currents $i_1$, $i_2$, and $i_3$, which are used to drive the respective LED strings S1, S2, and S3. The ratio of drive currents $i_1$, $i_2$, and $i_3$ that are provided through respective LED strings S1, S2, and S3 may be adjusted to effectively control the relative intensities of the reddish light emitted from the red LEDs 82 of LED string S1, the yellowish/greenish light emitted from the low BSY-L LEDs 82 of LED string S2, and the yellow/greenish light emitted from the high BSY-H LEDs 82 of LED string S3. The resultant light from each LED string S1, S2, and S3 mixes to generate an overall light output that has a desired color, CCT, and intensity, the latter of which may also be referred to a dimming level. As noted, the overall light output may be white light that falls on or within a desired proximity of the BBL and has a desired CCT.

The number of LED strings Sx may vary from one to many and different combinations of LED colors may be used in the different strings. Each LED string Sx may have LEDs 82 of the same color, variations of the same color, or substantially different colors. In the illustrated embodiment, each LED string S1, S2, and S3 is configured such that all of the LEDs 82 that are in the string are all essentially identical in color. However, the LEDs 82 in each string may vary substantially in color or be completely different colors in certain embodiments. In another embodiment, three LED strings Sx with red, green, and blue LEDs may be used, wherein each LED string Sx is dedicated to a single color. In yet another embodiment, at least two LED strings Sx may be used, wherein the same or different colored BSY or BSG LEDs are used in one of the LED strings Sx and red LEDs are used in the other of the LED strings Sx. A single string embodiment is also envisioned, where currents may be individually adjusted for the LEDs of the different colors using bypass circuits, or the like.

The driver module 30 depicted in FIG. 15 generally includes AC-DC conversion circuitry 106, control circuitry 110, and a number of current sources, such as the illustrated DC-DC converters 112. The AC-DC conversion circuitry 106 is adapted to receive an AC power signal (AC IN), rectify the AC power signal, correct the power factor of the AC power signal, and provide a DC output signal. The DC output signal may be used to directly power the control circuitry 110 and any other circuitry provided in the driver module 30, including the DC-DC converters 112, a communication interface 114, as well as the image sensor 34.

The DC output signal may also be provided to the power bus, which is coupled to one or more power ports, which may be part of the standard communication interface. The DC output signal provided to the power bus may be used to provide power to one or more external devices that are coupled to the power bus and separate from the driver module 30. These external devices may include the communications module 32 and any number of auxiliary devices, such as the image sensor 34. Accordingly, these external devices may rely on the driver module 30 for power and can be efficiently and cost effectively designed accordingly. The AC-DC conversion circuitry 108 of the driver module 30 is robustly designed in anticipation of being required to supply power to not only its internal circuitry and the LED array 20, but also to supply power to these external devices. Such a design greatly simplifies the power supply design, if not eliminating the need for a power supply, and reduces the cost for these external devices.

As illustrated, the three respective DC-DC converters 112 of the driver module 30 provide drive currents $i_1$, $i_2$, and $i_3$ for the three LED strings S1, S2, and S3 in response to control signals CS1, CS2, and CS3. The control signals CS1, CS2, and CS3 may be pulse width modulated (PWM) signals that effectively turn the respective DC-DC converters on during a logic high state and off during a logic low state of each period of the PWM signal. In one embodiment the control signals CS1, CS2, and CS3 are the product of two PWM signals.

The first PWM signal is a higher frequency PWM signal that has a duty cycle that effectively sets the DC current level through a corresponding one of LED strings S1, S2, and S3, when current is allowed to pass through the LED strings S1, S2, and S3. The second PWM signal is a lower frequency signal that has a duty cycle that corresponds a desired dimming or overall output level. In essence, the higher frequency PWM signals set the relative current levels though each LED string S1, S2, and S3 while the lower frequency PWM signal determines how long the drive currents $i_1$, $i_2$, and $i_3$ are allowed to pass through the LED strings S1, S2, and S3 during each period of the lower frequency PWM signal. The longer the drive currents $i_1$, $i_2$, and $i_3$ are allowed to flow through the LED strings S1, S2, and S3 during each period, the higher the output level, and vice versa.

Figure 16:
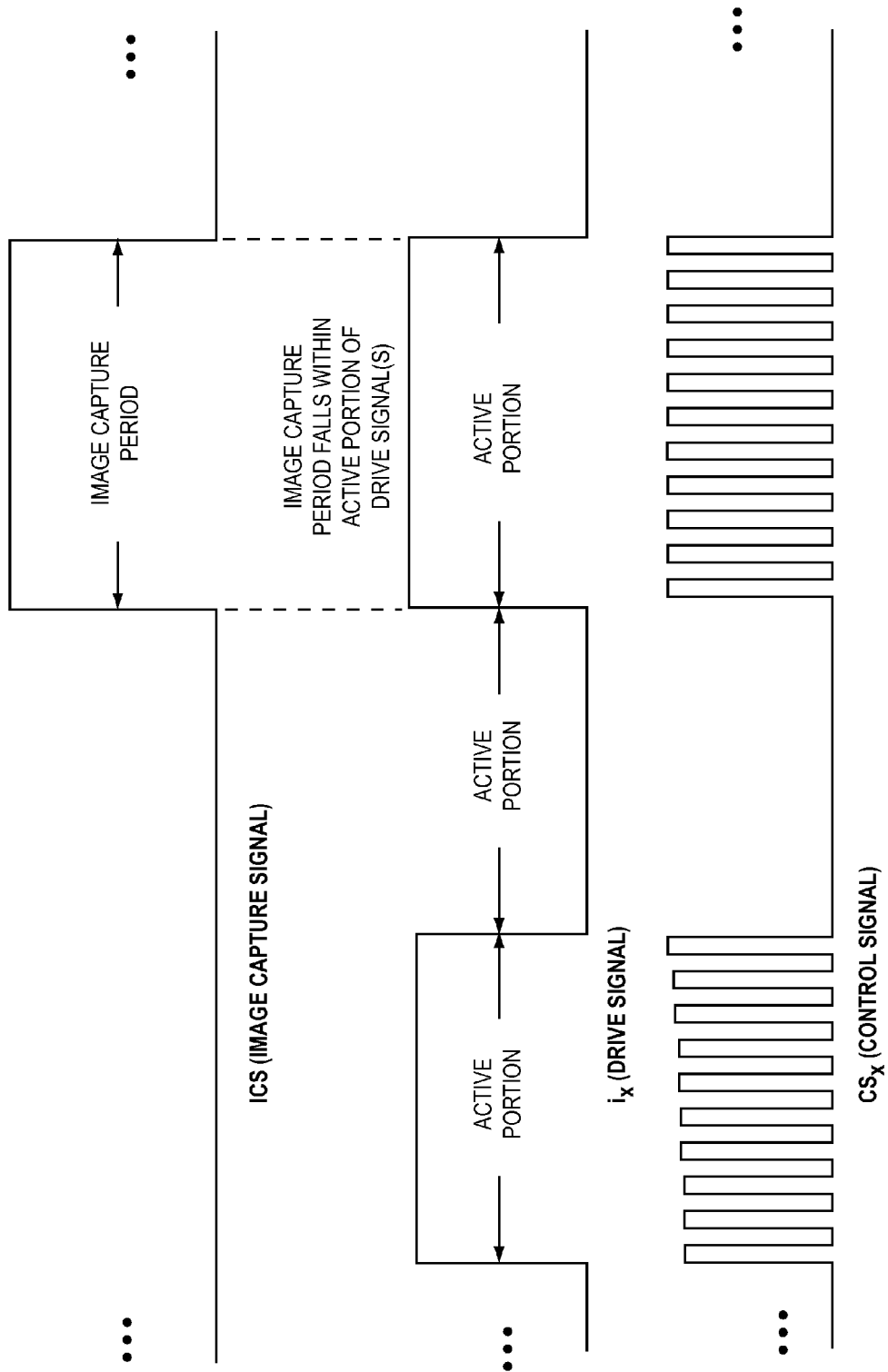
FIG. 16 is a timing diagram that shows the relationship of an image capture signal, a drive signal, and a control signal according to one embodiment of the disclosure.

Given the reactive components associated with the DC-DC converters 112, the relative current levels set with the higher frequency PWM signals may be filtered to a relative DC current. However, this DC current is essentially pulsed on and off based on the duty cycle of the lower frequency PWM signal. For example, the higher frequency PWM signal may have a switching frequency of around 200 KHz, while the lower frequency PWM signal may have a switching frequency of around 1 KHz. FIG. 16 illustrates a control signal $CS_X$, which has the higher and lower frequency PWM components, and a resultant drive current $i_X$. During the active portions, the LED array 20 will emit light. During the inactive potions, the LED array will not emit light. FIG. 16 is described below in greater detail in the discussion related to coordinating image capture periods with active portions of the currents $i_X$ (drive signal).

In certain instances, a dimming device may control the AC power signal. The AC-DC conversion circuitry 106 may be configured to detect the relative amount of dimming associated with the AC power signal and provide a corresponding dimming signal to the control circuitry 110. Based on the dimming signal, the control circuitry 110 will adjust the drive currents $i_1$, $i_2$, and $i_3$ provided to each of the LED strings S1, S2, and S3 to effectively reduce the intensity of the resultant light emitted from the LED strings S1, S2, and S3 while maintaining the desired CCT. As described further below, the color, CCT and dimming levels may be initiated internally or received from the commissioning tool 36, a wall controller, or another lighting fixture 10. If received from an external device via the communications module 32, the color, CCT and/or dimming levels are delivered from the communications module 32 to the control circuitry 110 of the driver module 30 in the form of a command via the communication bus. The driver module 30 will respond by controlling the drive currents $i_1$, $i_2$, and $i_3$ in the desired manner to achieve the requested color, CCT and/or dimming levels.

The color, CCT, and intensity of the light emitted from the LEDs 82 may be affected by temperature. If associated with a thermistor $S_T$ or other temperature-sensing device, the control circuitry 110 can control the drive currents $i_1$, $i_2$, and $i_3$ provided to each of the LED strings S1, S2, and S3 based on ambient temperature of the LED array 20 in an effort to compensate for temperature effects. The control circuitry 110 may also trigger image capture by and receive image data from the image sensor 34. The image data may be processed by the control circuitry 110 to make occupancy determinations, determine ambient light levels, and control the drive currents $i_1$, $i_2$, and $i_3$ in a desired fashion based on the occupancy conditions and ambient light levels. Each of the LED strings S1, S2, and S3 may have different temperature compensation adjustments, which may also be functions of the magnitude of the various drive currents $i_1$, $i_2$, and $i_3$.

The control circuitry 110 may include a central processing unit (CPU) and sufficient memory 116 to enable the control circuitry 110 to bidirectionally communicate with the communications module 32 or other devices over the communication bus through an appropriate communication interface (I/F) 114 using a defined protocol, such as the standard protocol described above. The control circuitry 110 may receive data or instructions from the communications module 32 or other device and take appropriate action to process the data and implement the received instructions. The instructions may range from controlling how the LEDs 82 of the LED array 20 are driven to returning operational data, such as image, temperature, occupancy, light output, or ambient light information, that was collected by the control circuitry 110 to the communications module 32 or other device via the communication bus. Notably, the functionality of the communications module 32 may be integrated into the driver module 30, and vice versa.

Notably, when the term "control system" is used in the claims or generically in the specification, the term should be construed broadly to include the hardware and any additional software or firmware that is needed to provide the stated functionality. The term "control system" should not be construed as only software, as electronics are needed to implement any control system that is defined herein. For example, a control system may, but does not necessarily, include the control circuitry 110, the DC-DC converters 112, the AC-DC conversion circuitry 106, and the like.

For occupancy or ambient light sensing, the image sensor 34 is configured to capture an image in response to an image capture signal ICS, which may be provided by the control circuitry 110. The image capture signal may be triggered on a rising edge, a falling edge, or during an active portion of the signal. As noted, the LED array 20 emits light in response to one or more drive signals, such as the drive currents $i_1$, $i_2$, $i_3$ that are shown driving the three LED strings S1, S2, and S3 in FIG. 15. The control circuitry 110 provides control signals CS1, CS2, and CS3 to the respective DC-DC converters 112, which in turn provide the drive currents $i_1$, $i_2$, $i_3$ that are shown driving the three LED strings S1, S2, and S3. These drive currents $i_1$, $i_2$, $i_3$ are individually and collectively referred to herein as a "drive signal," which is used to control the light emitted by the LED array 20.

When an image needs to be captured, the control circuitry 110 provides the image capture signal ICS. When capturing an image, the control circuitry 110 may coordinate the image capture signal ICS and the drive signal (via the control signals CS1, CS2, and CS3) so that the image sensor 34 captures the image when the LED array 20 is emitting light. The resulting image data is provided to the control circuitry 110 for further processing, storage, analysis, and/or distribution to other entities, such as other lighting fixtures 10, remote entities, etc.

The control circuitry 110 may also control the drive signal to control the light emitted by the LED array 20 based, at least in part, on information derived from one or more captured images. For example, the control circuitry 110 may use the image sensor 34 to facilitate occupancy detection, ambient light sensing, or both. As such, the image sensor 34 may replace a traditional occupancy detector, ambient light sensor, or both. For occupancy detection, periodically captured images may be analyzed by the control circuitry to determine whether someone is present or there is movement in a field of view that can be captured by the image sensor 34. For example, images captured over time may be analyzed for differences, wherein the presence of differences in successive images or differences between a current image and a reference image is indicative of occupancy. A lack of differences in the successive images or between a current image and reference image may be indicative of vacancy, or a lack of occupancy. The extent or type of differences required to be indicative of occupancy or vacancy may be varied to prevent false occupancy and vacancy determinations. Further, areas of the captured image may be ignored to prevent false detections.

If the field of view for the image sensor 34 covers an area of interest and an area of no interest, the portion of the image data that corresponds to the area of no interest may be ignored, while only the portion of the image data that corresponds to the area of interest is analyzed for occupancy and vacancy determinations. For example, if the field of view for the image sensor 34 covers a conference room (an area of interest) and extends through a window to cover an exterior sidewalk (an area of no interest), the portion of the image data that corresponds to the sidewalk or anywhere outside of the conference room may be ignored, while only the portion of the image data that corresponds to conference room is analyzed for occupancy and vacancy determinations.

If the lighting fixture 10 is in an off state in which light is not being emitted for general illumination, the control circuitry 110 may keep the lighting fixture 10 in the off state until occupancy (or motion) is detected. Once occupancy is detected, the control circuitry will transition the lighting fixture 10 to an on state in which light is emitted for general illumination at a desired output level. After occupancy is no longer detected (vacancy), the control circuitry may transition the lighting fixture 10 back to the off state. Various occupancy modes, or operating protocols, are known to those skilled in art.

To use the image sensor 34 for occupancy detection, images may need to be captured when the lighting fixture 10 is in the off state or the on state. In the off state, the lighting fixture 10 may be in an environment that is so dark that images captured by the image sensor 34 are effectively underexposed and have insufficient information to make occupancy decisions. Notably, images are not captured instantly. The image sensor 34 captures each image during a brief image capture period. In the off state, the control circuitry 110 may cause the LED array 20 to emit light for a brief period that substantially coincides with the image capture period. As such, the field of view is illuminated during the image capture period by the light emitted from the LED array 20 to make sure that the captured image is sufficiently exposed and is able to provide sufficient information to make occupancy decisions.

When the lighting fixture 10 is in the off state, the light emitted by the LED array 20 during an image capture period may differ from the light emitted for general illumination during the on state in output level, spectral content, or both. For example, light emitted during the image capture period may be emitted at a lower or higher lumen level than the light emitted for general illumination during the on state. The light emitted during the image capture period may also have a different color spectrum than the light emitted for general illumination during the on state. The different color spectrums may differ in width, location, or both. The different color spectrums may or may not overlap. For instance, the white light for general illumination may reside within a 2- or 4-step MacAdam Ellipse of the Black Body Locus (BBL) and have CCT between 2700 and 5700 K while the light emitted during the image capture period may be outside of this specification and optimized for the image sensor 34.

In one embodiment, the color spectrum for the light emitted during image capture is less visible or perceptible to humans than the light emitted during general illumination. For example, the light emitted during the image capture periods may be shifted toward red or infrared with respect to the color spectrum for the white light emitted during general illumination. In particular, white light may be used for general illumination, while red or infrared light may be used during the image capture periods. As such, the flashes of red or infrared light that occur during the image capture periods in darker or non-illuminated rooms are imperceptible, or at least less perceptible and distracting than if the white light that is emitted for general illumination was used during the image captures periods. The image sensor 34 may have a CCD or CMOS-based sensor and be responsive to both spectrums. The light emitted during image capture should include, but need not be limited to, light that resides in a spectrum in which the image sensor 34 is responsive.

When the lighting fixture 10 is in the on state, the control circuitry 110 will cause the LED array 20 to emit light at a desired output level, color, CCT, or a combination thereof for general illumination. For occupancy detection in the on state, periodically captured images may be analyzed by the control circuitry 110 to determine whether someone is present or there is movement in a field of view that can be captured by the image sensor 34. Occupancy determinations may dictate whether the lighting fixture 10 remains in the on state or transitions to the off state in traditional fashion. The control circuitry 110 may simply capture these images on a periodic basis while using the same white light that is emitted for general illumination for capturing images.

Alternatively, the control circuitry 110 may cause the LED array 20 to change a characteristic of the light that is emitted for general illumination during the brief image capture periods. The light emitted by the LED array 20 during the image capture periods may differ from the light emitted for general illumination in output level or spectral content. For instance, light emitted during the image capture period may be emitted at a lower or higher lumen level than the light emitted for general illumination. The light emitted during the image capture period may also have a different color spectrum than the light emitted during general illumination. The different color spectrums may differ in width, location, or both, such that the light differs in perceptibility, color, CCT, and the like. The different color spectrums may or may not overlap. For instance, the light for general illumination may reside within a 2- or 4-step MacAdam Ellipse of the Black Body Locus (BBL) and have CCT between 2700 and 5700 K while the light emitted during the image capture period may be outside of a 4-step MacAdam Ellipse of the BBL.

Further, the output level of the light emitted during the image capture periods may be reduced from the output level for general illumination to avoid an overexposed image when the image sensor 34 would be subjected to too much light at the general illumination levels. In contrast, the output level of the light emitted during the image capture periods may be increased from the output level for general illumination to avoid an underexposed image when the image sensor 34 would be subjected to too little light at the general illumination output levels. In the on state, any changes in the characteristics of the light during the image capture periods are preferably imperceptible or minimally perceptible to humans. The changes may be made imperceptible or minimally perceptible because the change in the light is for a relatively short duration that corresponds to the image capture period.

For lighting fixtures 10 that employ solid state lighting sources, such as the LEDs of the LED array 20, the drive signal may be pulse width modulated (PWM) for at least certain output levels. Typically, the duty cycle of the PWM drive signal dictates a relative dimming level of the light output of the LED array 20. For each period of the PWM signal, the LED array 20 outputs light during an active portion of the PWM drive signal and does not output light during an inactive portion of the PWM drive signal. In operation, the LED array 20 is turning on and off at a frequency that is essentially imperceptible to humans during general illumination at some or all output levels.

Due to the phenomena of visual persistence, humans will perceive the periodic light pulses as constant illumination. The longer that light is emitted during each PWM period, the higher the perceived output level of the light, and vice versa. In other words, the higher the duty cycle, the higher the perceived output level of the light, and vice versa.

While humans perceive these rapid pulses of light as constant illumination, the image sensor 34 does not. The image sensor 34 does not have visual persistence, and image capture is affected by transitions in light levels during image capture periods. For example, a captured image may be underexposed if the image is captured during an image capture period where the light is emitted for part of the image capture period and not emitted for another part of the image capture period. Depending on the light level selected for general illumination, the captured image may be overexposed if captured during the active portion of the PWM drive signal when light is being emitted, and underexposed during the inactive portion of the PWM drive signal when the light is not being emitted during general illumination.

Thus, when capturing an image, the control circuitry 110 provides the image capture signal ICS so that the image capture period falls within an active portion of the PWM drive signal such that the LED array 20 is emitting light during the image capture period. The control circuitry 110 may also alter the characteristic of the emitted light relative to the light emitted for general illumination during the image capture periods. For example, the light emitted for general illumination may be provided at a different output level, color spectrum (color, CCT, etc.), or both relative to the light emitted during the image capture periods to help ensure proper exposure of the captured image. Alternatively, the light emitted during the image capture periods may also have the same characteristics as the light emitted for general illumination. These concepts apply to both the on and off states.

Images may also be captured and analyzed to determine the characteristics of ambient light when light is and is not being emitted from the lighting fixture 10. The characteristics of the ambient light may be used in a variety of ways. For example, the ambient light characteristics may dictate the output level, color spectrum (i.e. color, CCT), or both of the light that is emitted for general illumination, during the image capture periods, or both. As such, the image sensor 34 may be used as an ambient light sensor. The control circuitry 110 can iteratively determine an actual ambient light level during general illumination from the captured images and regulate the output level of the emitted light up or down so that the actual ambient light level corresponds to a reference output level for both general illumination or image capture, even as light from other lighting sources, such as the sun or another lighting fixture 10 changes.

Similarly, the control circuitry 110 can iteratively determine the color spectrum of the ambient light during general illumination from the captured images and regulate the color spectrum of the emitted light so that the color spectrum of the ambient light corresponds to, or is at least shifted in the direction of, a reference color spectrum. The control circuitry 110 can also regulate the color spectrum and level of the emitted light so that the ambient light color spectrum corresponds to the reference color spectrum and the ambient light level corresponds to a reference output level at the same time. When the LED array 20 is emitting light, the ambient light represents a combination of the light emitted from the LED array 20 and any light provided by sources other than the lighting fixture 10.

For ambient light sensing, the images may be captured when light is being emitted from the LED array 20, when light is not being emitted from the LED array 20, or both. Images captured without light being emitted from the LED array 20 will provide ambient light information (i.e. output level, color spectrum) without the lighting contribution of the LED array 20. With this information, the control circuitry 110 can determine an output level, the color spectrum, or both for light to emit to achieve a desired reference when added to the ambient conditions. Alternatively, information from the images captured with light being emitted from the LED array 20 allow the control circuitry 110 to determine how to adjust the light being emitted from the LED array 20 in output level, color spectrum, or both to achieve a desired reference.

The images, information determined from the images, or instructions derived from the images may be sent to other lighting fixtures 10 and remote devices. For example, a first lighting fixture 10 may receive images or image information from one or more other lighting fixtures 10, and use the received images or image information alone or in conjunction with images or image information that was captured by the first lighting fixture 10 to control the light output of the first lighting fixture 10 as well as at least one of the one or more lighting fixtures 10. As such, the light emitted from the first lighting fixture 10 may be further controlled based on images or image information that was gathered from multiple lighting fixtures 10, including the first lighting fixture 10. Images from the various lighting fixtures 10 may be sent to a central security location for monitoring by security personnel or storage. As such, the same image sensor 34 may be used as an ambient light sensor, occupancy sensor, and a security camera. The images may represent still images as well as full or partial frames of a video.

The following provides some examples of the above-described concepts using the embodiment of FIG. 15. Assume the LED array 20 has three LED strings S1, S2, and S3. Each of the LED strings S1, S2, and S3 have multiple LEDs 82. LED strings S2 and S3 only have BSY LEDs 82 with the same or different color spectrums, while LED string S1 has only red LEDs 82 with generally the same color spectrum. For general illumination, the control circuitry 110 may provide the control signals CS1, CS2, and CS3 to provide drive currents $i_1$, $i_2$, and $i_3$ through the LED strings S1, S2, and S3 at ratios that result in white light at a desired output level and with a desired CCT. During each image capture period while providing general illumination in the on state, the control circuitry 110 may essentially turn off LED strings S2 and S3, which would normally provide bluish-yellow light and continue driving LED string S1, which continues to provide red light. As a result, the emitted light for the LED array 20 is red light instead of the white light that results from mixing the bluish-yellow light from LED strings S2 and S3 with the red light from LED string S1. Once the image capture period is over, the control circuitry 110 reverts to providing the control signals SC1, SC2, and SC3, which results in white light being emitted for the LED strings S1, S2, and S3 at the desired output level and with the desired CCT.

Assume the red LEDs 82 emit red light with a wavelength centered close to 630 nm. Further assume that the image sensor 34 is responsive to red light with wavelengths centered close to 630 nm. Since humans are not very sensitive to light with wavelengths centered at or above 610 nm, brief flashes of red light that is centered at 630 nm is not very perceptible to humans, especially for short periods of time, when the lighting fixture 10 is the on state during general illumination or in an off state. In the on state, the brief periods of red light interrupt the white light being provided for general illumination during image capture periods. In the off state, the LED array 20 is not outputting light for general illumination. However, LED string S1 with the red LEDs will be periodically flashed to emit red light during image capture periods in the off state. In a darkened room, the red flashes of light when the lighting fixture 10 is in the off state will be much less perceptible than flashes of white light, if not essentially imperceptible. The perceptibility will be a function of the color of the red light and length of the image capture periods.

The image sensor 34 is able to capture images that have sufficient information for occupancy detection using only the red light. Notably, the output level of the red light provide by the LED string S1 during the image capture periods may stay the same, be increased, or be decreased relative to output level of the red light required for general illumination. When the drive signals are PWM signals, the image capture signals and the drive signals are controlled such that each image capture period falls within an active portion of the PWM drive signal for the LED string S1 of red LEDs 82.

In other embodiments, the control circuitry 110 may adjust one, two, or all of the drive currents $i_1$, $i_2$, and $i_3$ for LED strings S1, S2 and S3 during the image capture periods relative to that which is used for general illumination. As a result, the emitted light for the LED array 20 during the image capture periods will have a different color spectrum, output level, or both relative to the white light that is used for general illumination, but will use light from each of the LED strings S1, S2, and S3.

FIG. 16 illustrates the relationship of the control signal $CS_X$, the drive current $i_X$ (drive signal), and the image capture signal ICS. As noted above, the control signals $CS_X$ control the DC-DC converters 112 to provide the PWM drive signals $i_X$. When the drive signals $i_X$ are PWM signals, the image capture signal ICS and the drive signals $i_X$ are controlled such that each image capture period falls within an active portion of the PWM drive current $i_X$ for those LED strings S1, S2, and S3 that are being used during the image capture period. This concept holds true when operating in both the on and off states. Notably, the image capture signal ICS is illustrated to correspond to the image capture period. As noted above, image capture may be triggered in a variety of ways, and the image capture signal ICS does not need to have an active period that corresponds to the image capture period. The image capture period simply starts upon being triggered and will last a defined period of time.

As indicated above, the same light that is used for general illumination may be used during the image capture periods for on and off states. When the drive signals are PWM signals, the image capture signals and the drive signals are controlled such that each image capture period falls within an active portion of the PWM drive signal for the LED strings S1, S2, and S3.

In an alternative configuration, only (or a subset of the LED strings) LED string S1 is used for capturing images, and thus, is not used for general illumination. The other two LED strings S2 and S3 are only used for general illumination. The LED string S1 that is only used for capturing images may have one or more LEDs 82. If multiple LEDs 82 are used in the LED string S1, the LEDs 82 may include LEDs that emit the same or different colors of light, such that the composite of the light emitted by the LEDs 82 of LED string S1 has a spectrum that is compatible with the image sensor 34 and has a spectrum that different than that of the light used for general illumination. For example, the LEDs 82 of LED string S1 may have a mixture of red, green, and blue LEDs to make white light; a mixture of BSY and red LEDs to make white light, only red LEDs; only infrared (IR) LEDs; only white LEDs; etc. The output level of the light emitted by LED string S1 can be fixed or varied as needed based on ambient lighting conditions, which may also be determined using the image sensor 34.

Figure 17:
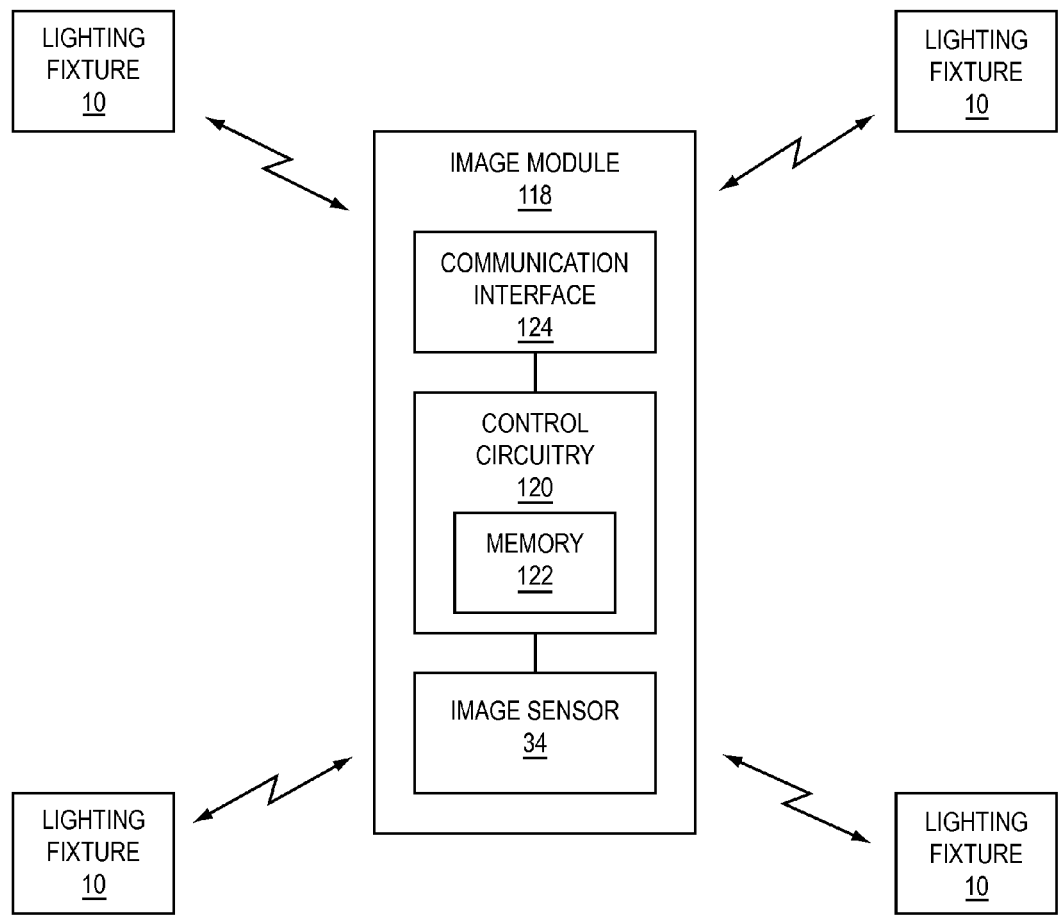
FIG. 17 is a block diagram of an image module according to one embodiment of the disclosure.

With reference to FIG. 17, one or more lighting fixtures 10 may be associated with a remotely located image module 118. The image module 118 will include an image sensor 34 and is configured to communicate with the lighting fixtures 10 over a wired or wireless network to facilitate operation that is analogous to that described above. Assuming the lighting fixtures 10 and the image module 118 are located in the same general vicinity, such as a conference room or outdoor parking lot, the image module 118 may capture image data and send the image data to the lighting fixtures 10 for processing. As such, the image module 118 can act as an ambient light sensor, occupancy sensor, security camera, or any combination thereof for the lighting fixtures 10. The lighting fixtures 10 will individually or collectively process the image data and make lighting decisions based on the image data. Alternatively, the image module 118 may process the image data, make lighting decisions based on the image data, and send instructions to the lighting fixtures 10, wherein the lighting fixtures 10 will control their light output based on the instructions.

The image module 118 and the associated lighting fixtures 10 may communicate with each other to ensure that images are captured at appropriate times. For example, the images may need to be captured when the lighting fixtures are:
 a. in the on state;
 b. in the off state;
 c. emitting light that is the same as the light used for general illumination;
 d. emitting light that is specially configured with a desired output level, color spectrum, or both for image capture (and different from the general illumination light); and
 e. emitting light during an active period when using PWM drive signals.

The timing of image capture and the characteristics of the light emitted during image capture may be controlled by the image module 118, the lighting fixtures 10, or combination thereof. The synchronization of the image capture periods at the image modules 118 with emission of light with the desired characteristics at the lighting fixtures 10 can be done with various synchronization techniques, as will be appreciated by those skilled in the art.

One method to synchronize the image capture and light is to calibrate the clocks of the image module 118 and the lighting fixtures 10. A calibration sequence can measure the communication latency by pulsing 'on' one lighting fixture 10 at a time and recognizing the change in light level with the image sensor 34. In normal operation, the time of image capture is coordinated between the image module 118 and lighting fixtures 10 using the communication latency to synchronize the local clocks.

The image module 118 will include control circuitry 120 that has memory 122 that is sufficient to hold the software and data necessary for operation. The control circuitry 120 is associated with the image sensor 34 and at least one communication interface 124 that is configured to support wired or wireless communications directly or indirectly through an appropriate network (not shown) with the lighting fixtures 10.

Figure 18:
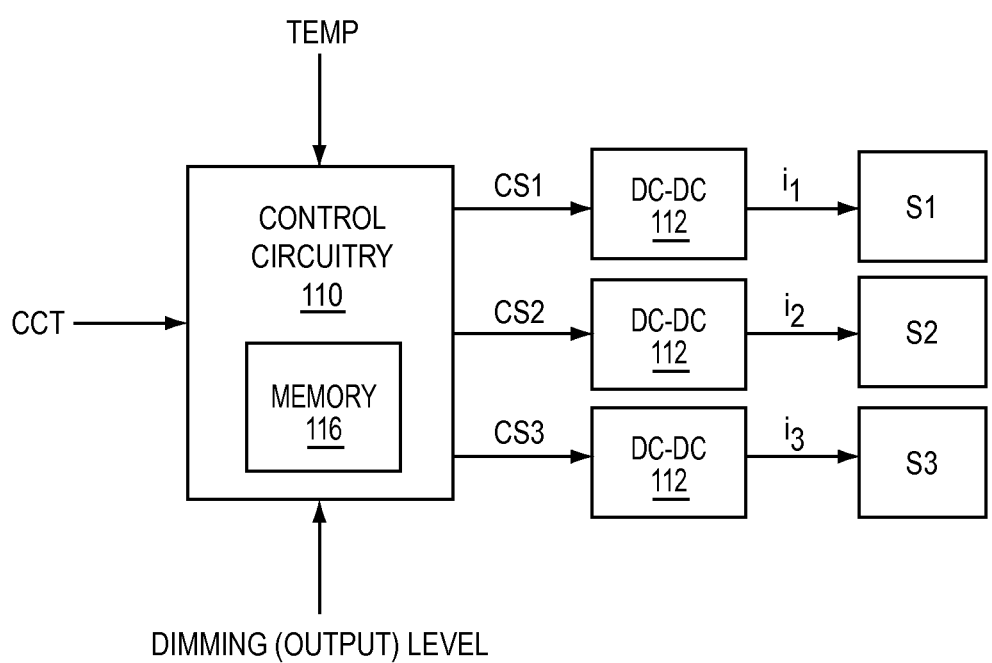
FIG. 18 is a functional schematic of the driver module of FIG. 15.

With reference to FIG. 18, an exemplary way to control the currents $i_1$, $i_2$, and $i_3$, which are provided to the respective LED strings S1, S2, and S3 is illustrated, such that the color and CCT of the overall light output can be finely tuned over a relatively long range and throughout virtually any dimming level. As noted above, the control circuitry 110 generates control signals CS1, CS2, and CS3, which control the currents $i_1$, $i_2$, and $i_3$. Those skilled in the art will recognize other ways to control the currents $i_1$, $i_2$, and $i_3$.

In essence, the control circuitry 110 of the driver module 30 is loaded with a current model in the form of one or more functions (equation) or look up tables for each of the currents $i_1$, $i_2$, and $i_3$. Each current model is a reference model that is a function of dimming or output level, temperature, and CCT. The output of each model provides a corresponding control signal CS1, CS2, and CS3, which effectively sets the currents $i_1$, $i_2$, and $i_3$ in the LED strings S1, S2, and S3. The three current models are related to each other. At any given output level, temperature, and CCT, the resulting currents $i_1$, $i_2$, and $i_3$ cause the LED strings S1, S2, and S3 to emit light, which when combined, provides an overall light output that has a desired output level and CCT, regardless of temperature. While the three current models do not need to be a function of each other, they are created to coordinate with one another to ensure that the light from each of the strings S1, S2, and S3 mix with one another in a desired fashion.

Figure 19:
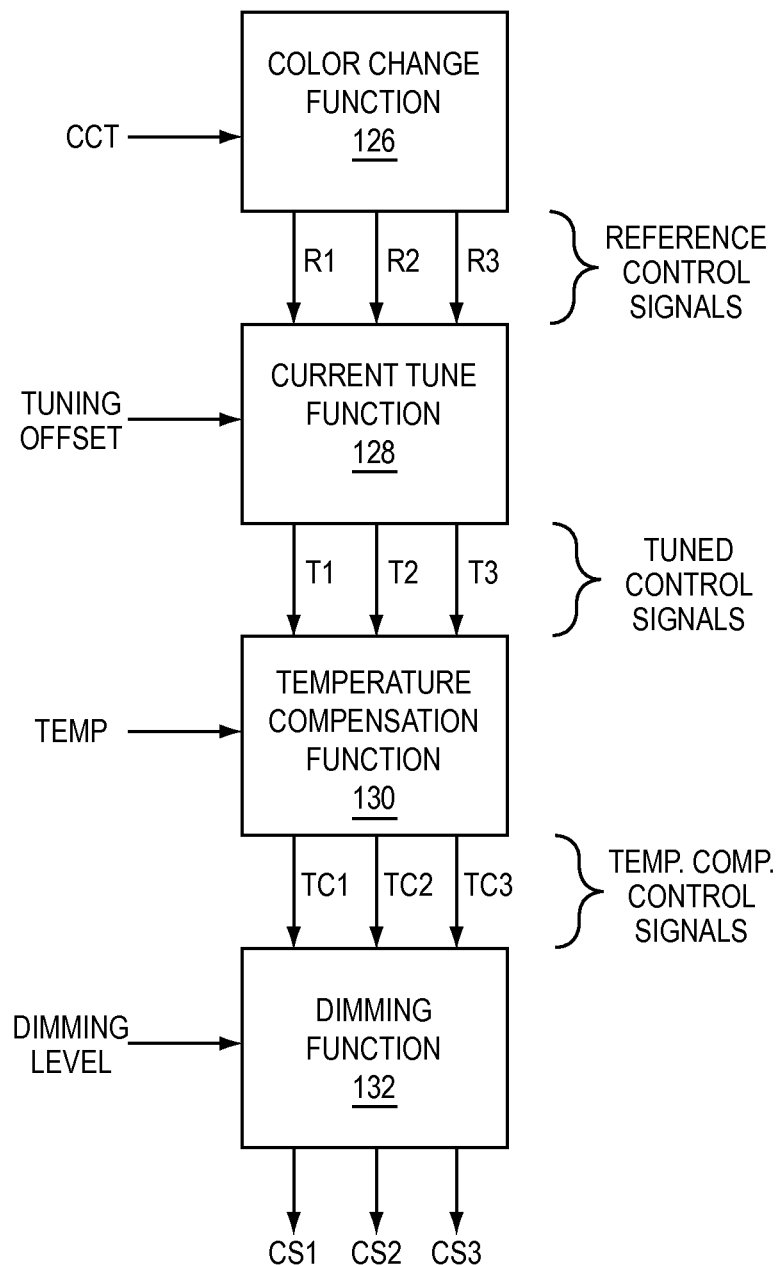
FIG. 19 is a flow diagram that illustrates the functionality of the driver module according to one embodiment.

With reference to FIG. 19, an exemplary process for generating the control signals CS1, CS2, and CS3 is provided. Initially, assume that the current models are loaded in the memory 116 of the control circuitry 110. Further assume that the current models are reference models for the particular type of lighting fixture 10.

Further assume that the desired CCT is input to a color change function 126, which is based on the reference models. The color change function 126 selects reference control signals R1, R2, and R3 for each of the currents $i_1$, $i_2$, and $i_3$ based on the desired CCT. Next, the reference control signals R1, R2, and R3 are each adjusted, if necessary, by a current tune function 128 based on a set of tuning offsets. The turning offsets may be determined through a calibration process during manufacturing or testing and uploaded into the control circuitry 110. The tuning offset correlates to a calibration adjustment to the currents $i_1$, $i_2$, and $i_3$ that should be applied to get the CCT of the overall light output to match a reference CCT. Details about the tuning offsets are discussed further below. In essence, the current tune function 128 modifies the reference control signals R1, R2, and R3 based on the tuning offsets to provide tuned control signals T1, T2, and T3.

In a similar fashion, a temperature compensation function 130 modifies the tuned control signals T1, T2, and T3 based on the current temperature measurements to provide temperature compensated control signals TC1, TC2, and TC3. Since light output from the various LEDs 82 may vary in intensity and color over temperature, the temperature compensation function 130 effectively adjusts the currents $i_1$, $i_2$, and $i_3$ to substantially counter the effect of these variations. The temperature sensor $S_T$ may provide the temperature input and is generally located near the LED array 20.

Finally, a dimming function 132 modifies the temperature compensated control signals TC1, TC2, and TC3 based on the desired dimming (output) levels to provide the controls signals CS1, CS2, and CS3, which drive the DC-DC converters 112 to provide the appropriate currents $i_1$, $i_2$, and $i_3$ to the LED strings S1, S2, and S3. Since light output from the various LEDs 82 may also vary in relative intensity and color over varying current levels, the dimming function 132 helps to ensure that the CCT of the overall light output corresponds to the desired CCT and intensity at the selected dimming (output) levels.

A wall controller, commissioning tool 36, or other lighting fixture 10 may provide the CCT setting and dimming levels. Further, the control circuitry 110 may be programmed to set the CCT and dimming levels according to a defined schedule, state of the occupancy and ambient light sensors $S_O$ and $S_A$, other outside control input, time of day, day of week, date, or any combination thereof. For example, these levels may be controlled based on a desired efficiency or correlated color temperature.

These levels may be controlled based the intensity (level) and/or spectral content of the ambient light, which is measured by analyzing image data retrieved from the image sensor 34. When controlled based on spectral content, the dimming or CCT levels may be adjusted based on the overall intensity of the ambient light. Alternatively, the dimming levels, color point, or CCT levels may be adjusted to either match the spectral content of the ambient light or help fill in spectral areas of the ambient light that are missing or attenuated. For example, if the ambient light is deficient in a cooler area of the spectrum, the light output may be adjusted to provide more light in that cooler area of the spectrum, such that the ambient light and light provided by the lighting fixtures 10 combine to provide a desired spectrum. CCT, dimming, or color levels may also be controlled based on power conditions (power outage, battery backup operation, etc.), or emergency conditions (fire alarm, security alarm, weather warning, etc.).

Figure 20:
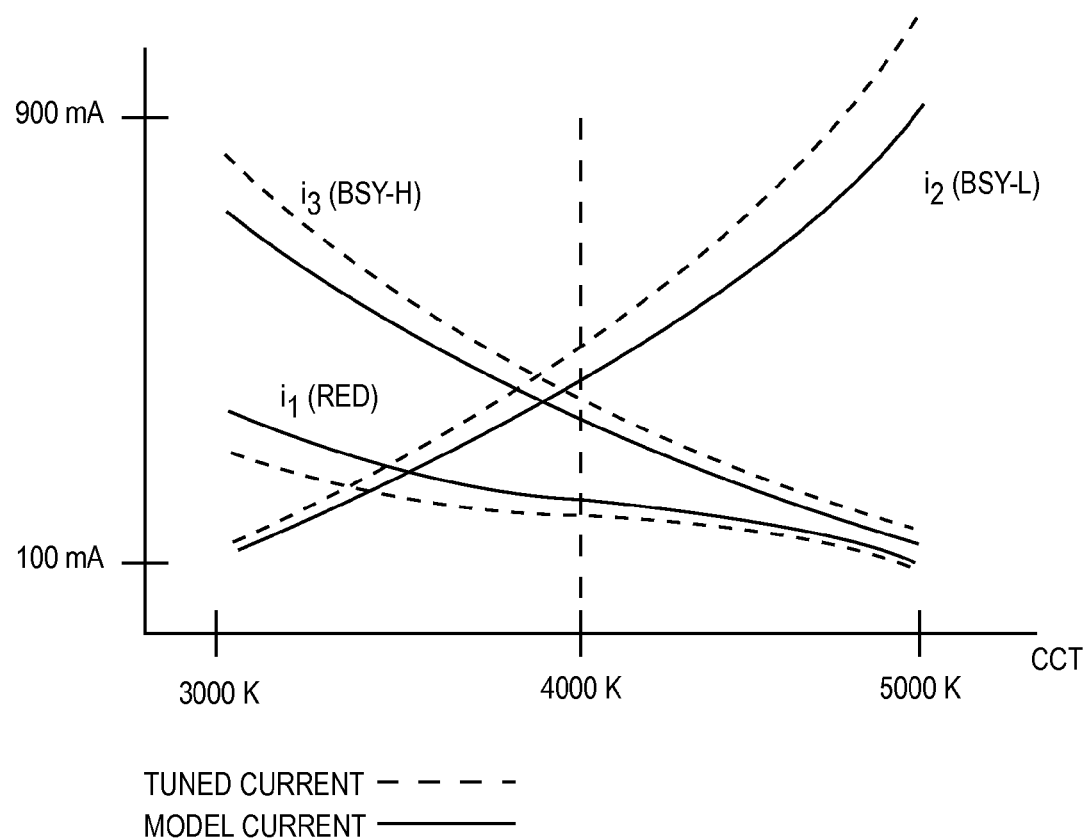
FIG. 20 is a graph that plots individual LED current versus CCT for overall light output according to one embodiment.

As noted, the tuning offset is generally determined during manufacture, but may also be determined and loaded into the lighting fixture 10 in the field. The tuning offset is stored in memory 116 and correlates to a calibration adjustment to the currents $i_1$, $i_2$, and $i_3$ that should be applied to get the CCT of the overall light output to match a reference CCT. With reference to FIG. 20, exemplary current curves are provided for reference (pre-tuned) currents and tuned (post-tuned) currents $i_1$, $i_2$, and $i_3$ over a CCT range of about 3000 K to 5000 K. The reference currents represent the currents $i_1$, $i_2$, and $i_3$ that are expected to provide a desired CCT in response to the reference control signals R1, R2, and R3 for the desired CCT. However, the actual CCT that is provided in response to the reference currents $i_1$, $i_2$, and $i_3$ may not match the desired CCT based on variations in the electronics in the driver module 30 and the LED array 20. As such, the reference currents $i_1$, $i_2$, and $i_3$ may need to be calibrated or adjusted to ensure that the actual CCT corresponds to the desired CCT. The tuning offset represents the difference between the curves for the model and tuned currents $i_1$, $i_2$, and $i_3$.

For single-point calibration, the tuning offset may be fixed multipliers that can be applied over the desired CCT range for the corresponding reference currents $i_1$, $i_2$, and $i_3$. Applying the fixed multipliers represents multiplying the reference currents $i_1$, $i_2$, and $i_3$ by corresponding percentages. In FIG. 13, the tuning offsets for the reference currents $i_1$, $i_2$, and $i_3$ may be 0.96 (96%), 1.04 (104%), and 1.06 (106%), respectively. As such, as reference currents $i_2$, and $i_3$ increase, the tuned currents $i_2$, and $i_3$ will increase at a greater rate. As reference current $i_1$ increases, the tuned current $i_1$ will increase at a lessor rate.

For example, a single calibration may take place at 25 C and a CCT of 4000 K wherein the tuning offsets are determined for each of the currents $i_1$, $i_2$, and $i_3$. The resultant tuning offsets for the currents $i_1$, $i_2$, and $i_3$ at 25 C and 4000 K may be applied to the respective model current curves. The effect is to shift each current curve up or down by a fixed percentage. As such, the same tuning offsets that are needed for currents $i_1$, $i_2$, and $i_3$ at 4000 K are applied at any selected CCT between 3000 K and 5000 K. The tuning offsets are implemented by multiplying the reference control signals R1, R2, and R3 by a percentage that causes the currents $i_1$, $i_2$, and $i_3$ to increase or decrease. As noted above, the reference control signals R1, R2, and R3 are altered with the tuning offsets to provide the tuned control signals T1, T2, and T3. The tuned control signals T1, T2, and T3 may be dynamically adjusted to compensate for temperature and dimming (output) levels.

While the fixed percentage-based tuning offsets may be used for calibration and manufacturing efficiency, other tuning offsets may be derived and applied. For example, the tuning offsets may be fixed magnitude offsets that are equally applied to all currents regardless of the CCT value. In a more complex scenario, an offset function can be derived for each of the currents $i_1$, $i_2$, and $i_3$ and applied to the control signals CS1, CS2, and CS3 over the CCT range. The lighting fixture 10 need not immediately change from one CCT level to another in response to a user or other device changing the selected CCT level. The lighting fixture 10 may employ a fade rate, which dictates the rate of change for CCT when transitioning from one CCT level to another. The fade rate may be set during manufacture, by the commissioning tool 36, wall controller, or the like. For example, the fade rate could be 500 K per second. Assume the CCT levels for a 5% dimming level and a 100% dimming level are 3000 K and 5000 K, respectively. If the user or some event changed the dimming level from 5% to 100%, the CCT level may transition from 3000 K to 5000 K at a rate of 500 K per second. The transition in this example would take two seconds. The dimming rate may or may not coincide with the CCT fade rate. With a fade rate, changes in the selected CCT level may be transitioned in a gradual fashion to avoid abrupt switches from one CCT level to another.

Those skilled in the art will recognize improvements and modifications to the embodiments of the present disclosure. All such improvements and modifications are considered within the scope of the concepts disclosed herein and the claims that follow.

What is claimed is:

1. A lighting fixture comprising:
    a solid state lighting source that is responsive to a drive signal;
    an image sensor configured to capture an image during an image capture period in response to an image capture signal; and
    a control system configured to:
        during an on state, control the drive signal such that light for general illumination is emitted from the solid state lighting source;
        during an off state, control the drive signal such that no light for general illumination is emitted from the solid state lighting source; and
        when capturing the image:
            provide the image capture signal; and
            control the drive signal such that light for image capture is continuously emitted from the solid state lighting source throughout the image capture period, wherein images are captured at different times throughout the on state and the off state and the light for general illumination differs from the light for image capture by at least one characteristic during the off state.

2. The lighting fixture of claim 1 wherein the at least one characteristic is color, such that a color for the light for general illumination is different than a color for the light for image capture.

3. The lighting fixture of claim 2 wherein the color for the light for image capture is shifted toward red light relative to the color for the light for general illumination.

4. The lighting fixture of claim 1 wherein the at least one characteristic is output level such that an output level for the light for general illumination is different than an output level for the light for image capture.

5. The lighting fixture of claim 1 wherein the at least one characteristic comprises:
    color such that a color for the light for general illumination is different than a color for the light for image capture; and
    output level such that an output level for the light for general illumination is different than an output level for the light for image capture.

6. The lighting fixture of claim 1 wherein the control system is configured to determine an ambient light level based at least in part on information from an image that was previously captured by the image sensor, and control the drive signal such that an output level of the light for general illumination is based at least in part on the ambient light level.

7. The lighting fixture of claim 1 wherein the light for general illumination is controlled to match the color spectrum of ambient light.

8. The lighting fixture of claim 1 wherein the light for general illumination is controlled to compensate for spectral deficiencies of ambient light.

9. The lighting fixture of claim 1 wherein the control system is configured to determine an ambient light color characteristic based at least in part on information from an image that was previously captured by the image sensor, and control the drive signal such that a color temperature of the light for general illumination is based at least in part on the ambient light color characteristic.

10. The lighting fixture of claim 1 wherein the control system is configured to determine an ambient light output level based at least in part on information from an image that was previously captured by the image sensor, and control the drive signal such that an output level of the light for image capture is based at least in part on the ambient light output level.

11. The lighting fixture of claim 1 wherein the control system is configured to determine an ambient light color characteristic based at least in part on information from an image that was previously captured by the image sensor, and control the drive signal such that a color of the light for image capture is based at least in part on the ambient light color characteristic.

12. The lighting fixture of claim 1 wherein the control system is configured to determine an occupancy state based at least in part on information from at least one image that was previously captured by the image sensor and determine whether to operate in the on state or the off state based on the occupancy state.

13. The lighting fixture of claim 12 wherein when in the on state, the control system is configured to determine an ambient light level based at least in part on information from at least one image that was previously captured by the image sensor, and control the drive signal such that an output level of the light for general illumination is based on the ambient light level.

14. The lighting fixture of claim 1 wherein the images captured by the image sensor are used to determine an ambient light characteristic and an occupancy state, and the control system is configured to determine how to control the drive signal based on the ambient light characteristic and whether to operate in the on state or the off state based on the occupancy state.

15. The lighting fixture of claim 14 wherein the control system is further configured to provide instructions to other lighting fixtures via a communication interface, wherein the instructions are based on at least one of the ambient light characteristic and the occupancy state and dictate how the other lighting fixtures control their light output.

16. The lighting fixture of claim 14 wherein the control system is further configured to send the image to at least one other lighting fixture via a communication interface.

17. The lighting fixture of claim 14 wherein the control system is further configured to send information from the image to at least one other lighting fixture via a communication interface.

18. The lighting fixture of claim 1 wherein:
throughout the image capture period, the control system is configured to control the drive signal such that the drive signal is pulse width modulated where each cycle of the drive signal has an active portion in which the light for image capture is continuously emitted and an inactive portion in which the light for image capture is not emitted; and
to capture the image, the control system controls at least one of the drive signal and the image capture signal to ensure that the image capture period falls within the active portion, such that the light for image capture is continuously emitted throughout at least the image capture period.

19. The lighting fixture of claim 1 wherein the solid state lighting source comprises a plurality of LEDs of a first color and a plurality of LEDs of a second color, which is different than the first color.

20. The lighting fixture of claim 19 wherein the light for image capture is the first color.

21. The lighting fixture of claim 20 wherein the first color is red.

22. The lighting fixture of claim 21 wherein the second color is at least one of a combination of blue light and yellow light and a combination of blue light and green light.

23. The lighting fixture of claim 20 wherein the light for general illumination is formed at least in part from the first color and the second color.

24. The lighting fixture of claim 20 wherein the first color is infrared.

25. The lighting fixture of claim 20 wherein the light for general illumination is white light.

26. The lighting fixture of claim 20 wherein the light for image capture is white light.

27. A lighting fixture comprising:
a solid state lighting source that is responsive to a pulse width modulated drive signal, wherein each cycle of the pulse width modulated drive signal has an active portion in which light for image capture is continuously emitted and an inactive portion in which the light for image capture is not emitted;
an image sensor configured to capture an image during an image capture period in response to an image capture signal; and
a control system configured to:
during an on state, control the pulse width modulated drive signal such that light for general illumination is emitted from the solid state lighting source;
during an off state, control the pulse width modulated drive signal such that no light is emitted from the solid state lighting source; and
when capturing the image, provide the image capture signal such that the image capture period falls within the active portion of the pulse width modulated drive signal.

28. The lighting fixture of claim 27 wherein the image capture period takes place during the on state.

29. The lighting fixture of claim 27 wherein the image capture period takes place during the off state and light for the image capture period that is separate from the light for general illumination is emitted when the image capture period takes place during the off state.

30. The lighting fixture of claim 27 wherein the control system is configured to control the pulse width modulated drive signal such that the light for general illumination differs from the light for image capture by at least one characteristic.

31. The lighting fixture of claim 30 wherein the at least one characteristic is color, such that a color for the light for general illumination is different than a color for the light for image capture.

32. The lighting fixture of claim 30 wherein the at least one characteristic is output level, such that an output level for the light for general illumination is different than an output level for the light for image capture.

33. The lighting fixture of claim 30 wherein the at least one characteristic comprises:
color, such that a color for the light for general illumination is different than a color for the light for image capture; and
output level, such that an output level for the light for general illumination is different than an output level for the light for image capture.

34. The lighting fixture of claim 30 wherein the control system is configured to determine an ambient light level based at least in part on information from an image that was previously captured by the image sensor, and control the pulse width modulated drive signal such that an output level of the light for general illumination is based at least in part on the ambient light level.

35. The lighting fixture of claim 30 wherein the control system is configured to determine an ambient light color characteristic based at least in part on information from an image that was previously captured by the image sensor, and control the pulse width modulated drive signal such that a color temperature of the light for general illumination is based at least in part on the ambient light color characteristic.

36. The lighting fixture of claim 30 wherein the control system is configured to determine an occupancy state based at least in part on information from at least one image that was previously captured by the image sensor, and determine whether to operate in the on state or the off state based on the occupancy state.

37. The lighting fixture of claim 27 wherein images captured by the image sensor are used to determine an ambient light characteristic and an occupancy state, and the control system is configured to determine how to control the pulse width modulated drive signal based on the ambient light characteristic and whether to operate in the on state or the off state based on the occupancy state.

38. The lighting fixture of claim 37 wherein the control system is further configured to provide instructions to other lighting fixtures via a communication interface, wherein the instructions are based on at least one of the ambient light characteristic and the occupancy state and dictate how the other lighting fixtures control their light output.

39. The lighting fixture of claim 37 wherein the control system is further configured to send the image to at least one other lighting fixture via a communication interface.

40. The lighting fixture of claim 37 wherein the control system is further configured to send information from the image to at least one other lighting fixture via a communication interface.

41. The lighting fixture of claim 27 wherein the solid state lighting source comprises a plurality of LEDs of a first color and a plurality of LEDs of a second color, which is different than the first color.

42. The lighting fixture of claim 41 wherein the light for image capture is the first color.

43. The lighting fixture of claim 42 wherein the first color is red.

44. The lighting fixture of claim 42 wherein the light for general illumination is formed at least in part from the first color and the second color.

45. The lighting fixture of claim 42 wherein the first color is infrared.

46. The lighting fixture of claim 42 wherein the light for general illumination is white light.

47. The lighting fixture of claim 42 wherein the light for image capture is white light.

48. The lighting fixture of claim 27 wherein the image sensor is a CMOS-based image sensor.

* * * * *